US012628173B2

(12) United States Patent
Kim et al.

(10) Patent No.:  US 12,628,173 B2
(45) Date of Patent:  May 12, 2026

(54) METHOD AND APPARATUS FOR TRANSMITTING AND RECEIVING DATA IN WIRELESS COMMUNICATION SYSTEM

(71) Applicant: LG Electronics Inc., Seoul (KR)

(72) Inventors: Kyuseok Kim, Seoul (KR); Jiwon Kang, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 641 days.

(21) Appl. No.: 18/013,771

(22) PCT Filed: Jul. 9, 2021

(86) PCT No.: PCT/KR2021/008808
§ 371 (c)(1),
(2) Date: Jun. 27, 2023

(87) PCT Pub. No.: WO2022/010314
PCT Pub. Date: Jan. 13, 2022

(65) Prior Publication Data
US 2023/0354347 A1      Nov. 2, 2023

(30) Foreign Application Priority Data
Jul. 10, 2020      (KR) ........................ 10-2020-0085521

(51) Int. Cl.
*H04W 72/23*      (2023.01)
*H04L 1/00*      (2006.01)
(Continued)

(52) U.S. Cl.
CPC ........... *H04W 72/23* (2023.01); *H04L 1/1854* (2013.01); *H04L 1/0003* (2013.01); *H04L 1/1812* (2013.01); *H04W 72/12* (2013.01)

(58) Field of Classification Search
CPC ... H04L 1/0003; H04L 1/0009; H04L 1/1812; H04L 1/1822; H04L 1/1854; H04L 1/189;
(Continued)

(56) References Cited

U.S. PATENT DOCUMENTS

| | | | | |
|---|---|---|---|---|
| 10,306,669 B2 * | 5/2019 | Koorapaty | ............ | H04L 1/1887 |
| 11,064,515 B2 * | 7/2021 | Koorapaty | ............ | H04W 72/23 |

(Continued)

FOREIGN PATENT DOCUMENTS

| | | | | | |
|---|---|---|---|---|---|
| CN | 109196905 A | * | 1/2019 | ........... | H04L 5/0094 |
| CN | 109417808 A | * | 3/2019 | .......... | H04W 72/569 |

(Continued)

OTHER PUBLICATIONS

Office Action in Korean Appln. No. 10-2022-7043776, mailed on Apr. 8, 2025, 9 pages (with English translation).
(Continued)

*Primary Examiner* — Eric Nowlin
(74) *Attorney, Agent, or Firm* — Fish & Richardson P.C.

(57)      ABSTRACT

Disclosed are a method and apparatus for transmitting and receiving data in a wireless communication system. A method for transmitting a physical uplink shared channel (PUSCH), according to an embodiment of the present disclosure, may comprise the steps of: receiving a first physical downlink control channel (PDCCH) for scheduling a first PUSCH and a second PDCCH for scheduling a second PUSCH; and transmitting the first PUSCH and the second PUSCH. The first PDCCH and the second PDCCH may be associated with different control resource sets (CORESETs) having different CORESET pool indexes, the second PDCCH may be received before the first PUSCH is transmitted after the time when the first PDCCH is received, and the first PUSCH and the second PUSCH may correspond to the same transport block (TB) on the basis of the same
(Continued)

PUSCHs based on the same TB

| Search space #1 CORESETPool Index #0 | Search space #2 CORESETPool Index #1 |
|---|---|

PUSCHs based on the same TB

| Search space #1 CORESETPool Index #0 | Search space #2 CORESETPool Index #1 |
|---|---|

< 1 slot

Period 1

Period 2

Time hybrid automatic repeat and request (HARQ) process identifier (ID) for the first PUSCH and the second PUSCH.

17 Claims, 22 Drawing Sheets

(51) Int. Cl.
   *H04L 1/1812*     (2023.01)
   *H04L 1/1829*     (2023.01)
   *H04W 72/12*      (2023.01)

(58) Field of Classification Search
   CPC ........ H04L 1/1896; H04L 5/00; H04W 72/12;
                                                    H04W 72/23
   See application file for complete search history.

(56)                References Cited

U.S. PATENT DOCUMENTS

| | | | | |
|---|---|---|---|---|
| 11,083,001 | B2 * | 8/2021 | Choi | H04L 1/0009 |
| 11,166,275 | B2 * | 11/2021 | Lee | H04W 72/12 |
| 11,324,024 | B2 * | 5/2022 | Khoshnevisan | H04W 72/02 |
| 11,356,151 | B2 * | 6/2022 | Sun | H04L 1/1861 |
| 11,374,694 | B2 * | 6/2022 | Nam | H04W 28/06 |
| 11,711,192 | B2 * | 7/2023 | Papasakellariou | H04L 1/1861 |
| | | | | 370/329 |
| 2019/0132861 | A1 * | 5/2019 | Koorapaty | H04L 1/1861 |
| 2019/0222360 | A1 * | 7/2019 | Nam | H04W 28/06 |
| 2019/0239247 | A1 * | 8/2019 | Koorapaty | H04L 1/1887 |
| 2019/0254025 | A1 * | 8/2019 | Lee | H04W 72/0446 |
| 2020/0015229 | A1 | 1/2020 | Yang et al. | |
| 2020/0106559 | A1 | 4/2020 | Vilaiporksawai et al. | |
| 2020/0107356 | A1 * | 4/2020 | Rico Alvarino | H04W 72/21 |
| 2020/0314883 | A1 * | 10/2020 | Chin | H04L 5/0094 |
| 2020/0351916 | A1 * | 11/2020 | Khoshnevisan | H04B 7/024 |
| 2021/0014026 | A1 * | 1/2021 | Papasakellariou | H04L 1/1861 |
| 2021/0160919 | A1 * | 5/2021 | Wang | H04L 1/1861 |
| 2021/0176776 | A1 * | 6/2021 | Choi | H04L 1/08 |
| 2022/0046691 | A1 * | 2/2022 | Kim | H04L 5/0055 |
| 2022/0052727 | A1 * | 2/2022 | Sun | H04L 5/0053 |
| 2022/0095338 | A1 * | 3/2022 | Kim | H04B 17/373 |
| 2022/0095354 | A1 * | 3/2022 | Kim | H04L 5/0094 |
| 2022/0159641 | A1 * | 5/2022 | Kim | H04L 5/0053 |
| 2022/0210816 | A1 * | 6/2022 | Wu | H04W 72/02 |
| 2022/0232613 | A1 * | 7/2022 | Gao | H04L 1/1887 |
| 2022/0377670 | A1 * | 11/2022 | Xue | H04W 76/28 |
| 2023/0030483 | A1 * | 2/2023 | Ji | H04L 5/0091 |
| 2023/0030756 | A1 * | 2/2023 | Zhang | H04L 5/0051 |
| 2023/0069352 | A1 * | 3/2023 | Yuan | H04L 5/0094 |
| 2023/0171073 | A1 * | 6/2023 | Gao | H04L 5/0055 |
| | | | | 370/329 |
| 2023/0397121 | A1 * | 12/2023 | Matsumura | H04W 52/04 |
| 2023/0397226 | A1 * | 12/2023 | Matsumura | H04L 5/0094 |
| 2024/0097747 | A1 * | 3/2024 | Sun | H04L 5/0094 |

FOREIGN PATENT DOCUMENTS

| | | | | | |
|---|---|---|---|---|---|
| CN | 109474998 | A | * | 3/2019 | H04W 72/232 |
| CN | 111602359 | A | * | 8/2020 | H04W 72/20 |
| CN | 115299157 | A | * | 11/2022 | H04W 52/54 |
| CN | 111602359 | B | * | 6/2023 | H04L 1/1835 |
| EP | 4117372 | A1 | * | 1/2023 | H04W 52/54 |
| EP | 3741067 | B1 | * | 3/2023 | H04W 72/20 |
| EP | 4236416 | A1 | * | 8/2023 | H04W 72/51 |
| KR | 10-2019-0017675 | A | | 2/2019 | |
| KR | 102648869 | B1 | * | 3/2024 | H04L 1/0023 |
| WO | WO-2019143618 | A1 | * | 7/2019 | H04W 72/20 |
| WO | WO-2020225680 | A1 | * | 11/2020 | H04W 72/23 |
| WO | WO-2021203442 | A1 | * | 10/2021 | H04W 52/54 |

OTHER PUBLICATIONS

PPO, "Text proposals for enhancements on Multi-TRP and panel Transmission," R1-2004047, 3GPP TSG RAN WG1 #101, e-Meeting, May 25-Jun. 5, 2020, 11 pages.
3GPP TS 38.214 V16.1.0 (Mar. 2020), "3rd Generation Partnership Project; Technical Specification Group Radio Access Network; NR; Physical layer procedures for data (Release 16)," Mar. 2020, 152 pages.
CATT, "Discussion on remaining issues of multi-TRP/panel transmission," R1-2003627, Presented at 3GPP TSG RAN WG1 Meeting #101, e-Meeting, May 25-Jun. 5, 2020, 12 pages.
Ericsson, "Remaining issues on Multi-TRP/Panel Transmission," R1-2004432, Presented at 3GPP TSG-RAN WG1 Meeting #101-e, e-Meeting, May 25-Jun. 5, 2020, 21 pages.
International Search Report in International Appln. No. PCT/KR2021/008808, mailed Nov. 1, 2021, 4 pages (with English Translation).

* cited by examiner (b)

(a)

METHOD AND APPARATUS FOR TRANSMITTING AND RECEIVING DATA IN WIRELESS COMMUNICATION SYSTEM

TECHNICAL FIELD

The present disclosure relates to a wireless communication system, and in more detail, relates to a method and an apparatus of transmitting and receiving an uplink/downlink data channel in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for transmitting and receiving an uplink/downlink data channel in a wireless communication system supporting multiple multi-transmission reception points (TRPs).

In addition, an additional technical object of the present disclosure is to provide a method and an apparatus for scheduling different physical downlink shared channels (PDSCHs)/physical uplink shared channels (PUSCHs) corresponding to the same transport block in multiple TRP transmissions based on multiple downlink control information.

The technical objects to be achieved by the present disclosure are not limited to the above-described technical objects, and other technical objects which are not described herein will be clearly understood by those skilled in the pertinent art from the following description.

Technical Solution

A method of transmitting a physical uplink shared channel (PUSCH) in a wireless communication system according to an aspect of the present disclosure may include: receiving a first physical downlink control channel (PDCCH) for scheduling a first PUSCH and a second PDCCH for scheduling a second PUSCH; and transmitting the first PUSCH and the second PUSCH. The first PDCCH and the second PDCCH may be associated with different control resource sets (CORESETs) having different CORESET pool indexes, the second PDCCH may be received before transmitting the first PUSCH after receiving the first PDCCH, and based on the same hybrid automatic repeat and request (HARQ) process identifier (ID) for the first PUSCH and the second PUSCH, the first PUSCH and the second PUSCH may correspond to the same transport block (TB).

A method of receiving a physical downlink shared channel (PDSCH) according to an aspect of the present disclosure may include: receiving a first physical downlink control channel (PDCCH) for scheduling a first PDSCH and a second PDCCH for scheduling a second PDSCH; and receiving the first PDSCH and the second PDSCH. The first PDCCH and the second PDCCH may be associated with different control resource sets (CORESETs) having different CORESET pool indexes, the second PDSCH may be received before transmitting hybrid automatic repeat and request (HARQ)-acknowledgement (ACK) information for the first PDSCH, and based on the same hybrid automatic repeat and request (HARQ) process identifier (ID) for the first PDSCH and the second PDSCH, the first PDSCH and the second PDSCH may correspond to the same transport block (TB).

Advantageous Effects

According to an embodiment of the present disclosure, the same transport block may be transmitted through different PDSCHs/PUSCHs scheduled through multiple downlink control information in a wireless communication system supporting transmission and reception of multiple transmission reception points (TRPs).

According to an embodiment of the present disclosure, it is possible to have a high degree of freedom in terms of downlink/uplink resource configuration by scheduling different PDSCHs/PUSCHs through different downlink control information.

In addition, when scheduling a plurality of PDSCHs/PUSCHs for transmission of the same transport block, reliability of a physical downlink control channel (PDCCH) may be increased by using different PDCCHs.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
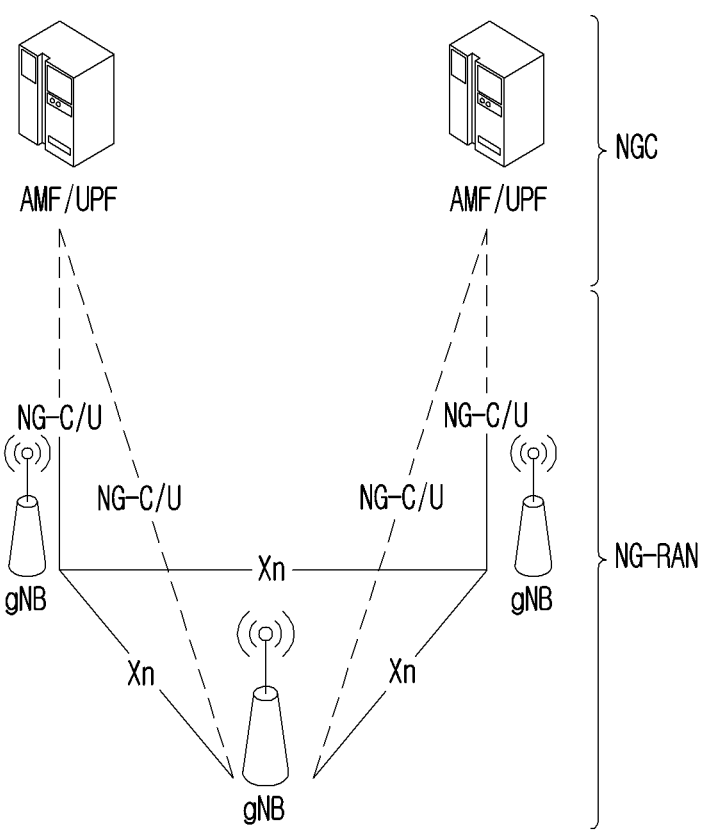
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal

6

FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
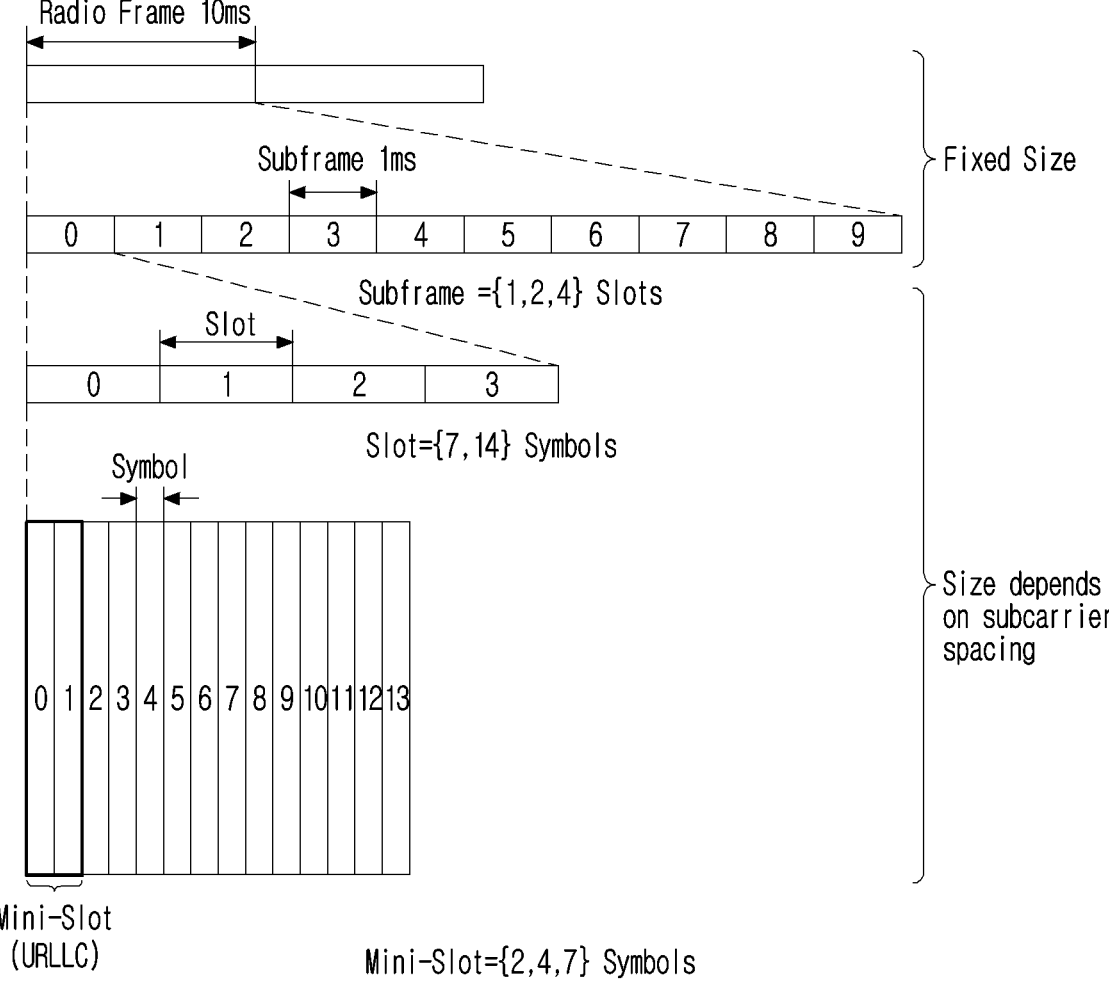
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = 2μ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of Tc=1/(Δfmax·Nf). Here, Δfmax is 480·103 Hz and Nf is 4096. Downlink and uplink transmission is configured (organized) with a radio frame having a duration of Tf=1/(ΔfmaxNf/100)·Tc=10 ms. Here, a radio frame is configured with 10 subframes having a duration of Tsf= (ΔfmaxNf/1000)·Tc=1 ms, respectively. In this case, there may be one set of frames for an uplink and one set of frames for a downlink. In addition, transmission in an uplink frame No. i from a terminal should start earlier by TTA=(NTA+ NTA,offset)Tc than a corresponding downlink frame in a corresponding terminal starts. For a subcarrier spacing configuration, slots are numbered in an increasing order of nsμ∈{0, . . . , Nslotsubframe,μ−1} in a subframe and are numbered in an increasing order of ns,fμ∈{0, . . . , Nslotframe,μ−1} in a radio frame. One slot is configured with Nsymbslot consecutive OFDM symbols and Nsymbslot is determined according to CP. A start of a slot ns in a subframe is temporally arranged with a start of an OFDM symbol nsμNsymbslot in the same subframe. All terminals may not perform transmission and reception at the same time, which means that all OFDM symbols of a downlink slot or an uplink slot may not be used. Table 3 represents the number of OFDM symbols per slot (Nsymbslot), the number of slots per radio frame (Nslotframe,μ) and the number of slots per subframe (Nslotsubframe,μ) in a normal CP and Table 4 represents the number of OFDM symbols per slot, the number of slots per radio frame and the number of slots per subframe in an extended CP.

TABLE 3

| μ | Nsymbslot | Nslotframe, μ | Nslotsubframe, μ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | Nsymbslot | Nslotframe, μ | Nslotsubframe, μ |
|---|---|---|---|
| 2 | 12 | 40 | 4 |

FIG. 2 is an example on=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
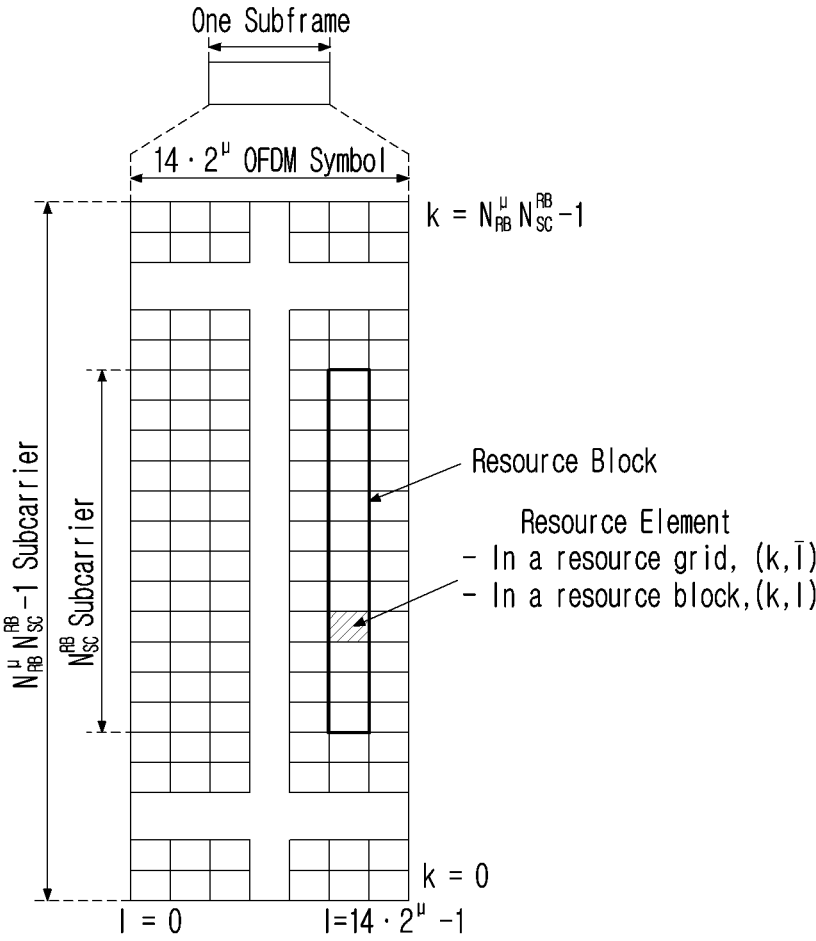
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with NABμNscRB subcarriers in a frequency domain and one subframe is configured with 14·2μ OFDM symbols, but it is not limited thereto. In an NR system, a transmitted signal is described by OFDM symbols of 2μNsymb(μ) and one or more resource grids configured with NRBμNscRB subcarriers. Here, NRBμ<NRBmax,μ. The NRBmax,μ represents a maximum transmission bandwidth, which may be different between an uplink and a downlink as well as between numerologies. In this case, one resource grid may be configured per and antenna port p. Each element of a resource grid for and an antenna port p is referred to as a resource element and is uniquely identified by an index pair (k,l'). Here, k=0, . . . , NRBμNscRB−1 is an index in a frequency domain and l'=0, . . . , 2μNsymb (μ)−1 refers to a position of a symbol in a subframe. When referring to a resource element in a slot, an index pair (k,l) is used. Here, l=0, . . . , Nsymbμ−1. A resource element (k,l') for and an antenna port p corresponds to a complex value, ak,l'(p,μ). When there is no risk of confusion or when a specific antenna port or numerology is not specified, indexes p and μ may be dropped, whereupon a complex value may be ak,l'(p) or ak,l'. In addition, a resource block (RB) is defined as NscRB=12 consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number nCRBμ and a resource element (k,l) for a subcarrier spacing configuration in a frequency domain is given as in the following Equation 1.

$$n_{CRB}^{\mu} = \left\lfloor \frac{k}{N_{sc}^{RB}} \right\rfloor$$ [Equation 1]

In Equation 1, k is defined relatively to point A so that k=0 corresponds to a subcarrier centering in point A. Physical resource blocks are numbered from 0 to NBWP,isize,μ−1 in a bandwidth part (BWP) and i is a number of a BWP. A relationship between a physical resource block nPRB and a common resource block nCRB in BWP i is given by the following Equation 2.

$$n_{CRB}^{\mu} = n_{PRB}^{\mu} + N_{BWP,i}^{start,\mu}$$ [Equation 2]

NBWP,istart,μ is a common resource block that a BWP starts relatively to common resource block 0.

Figure 4:
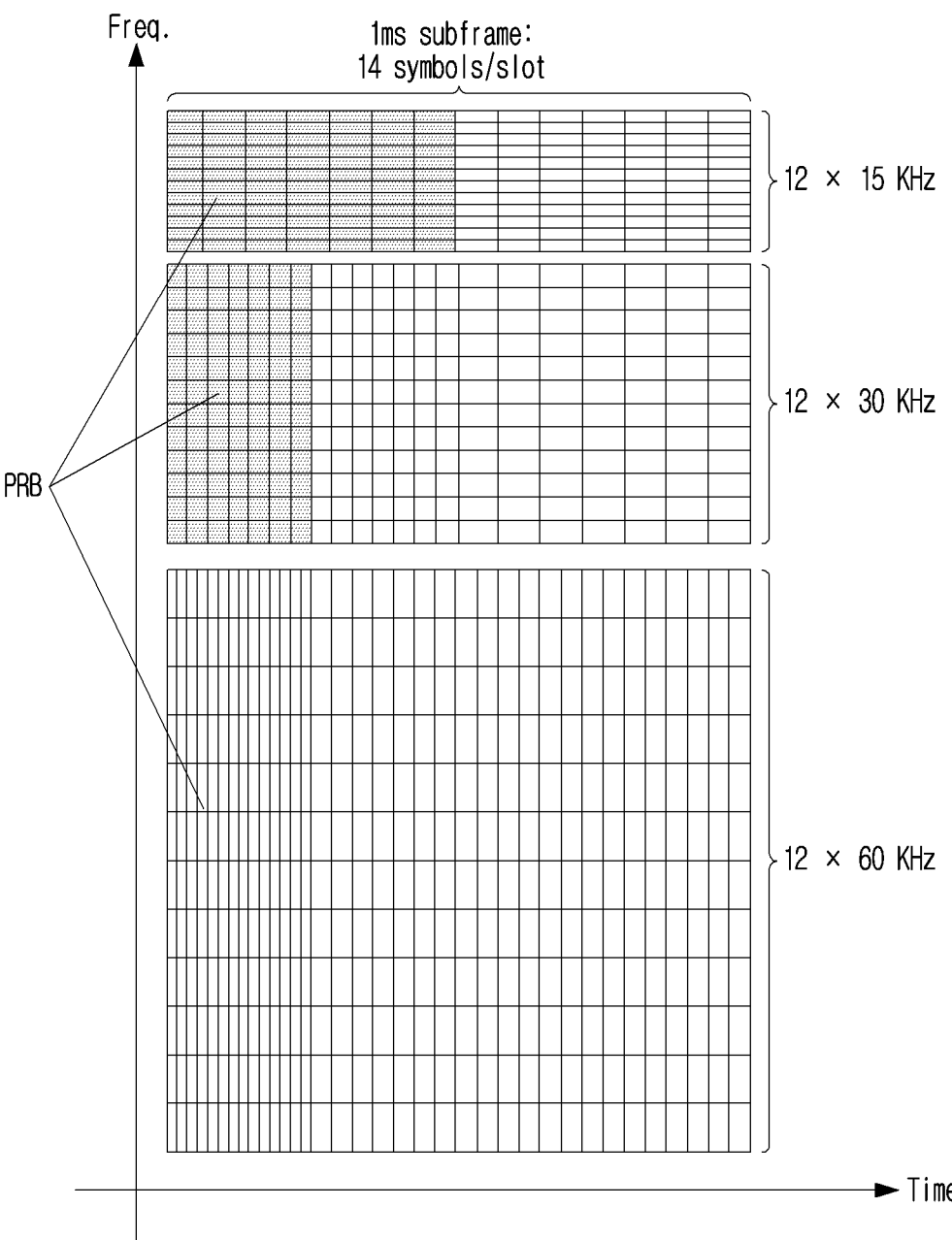
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
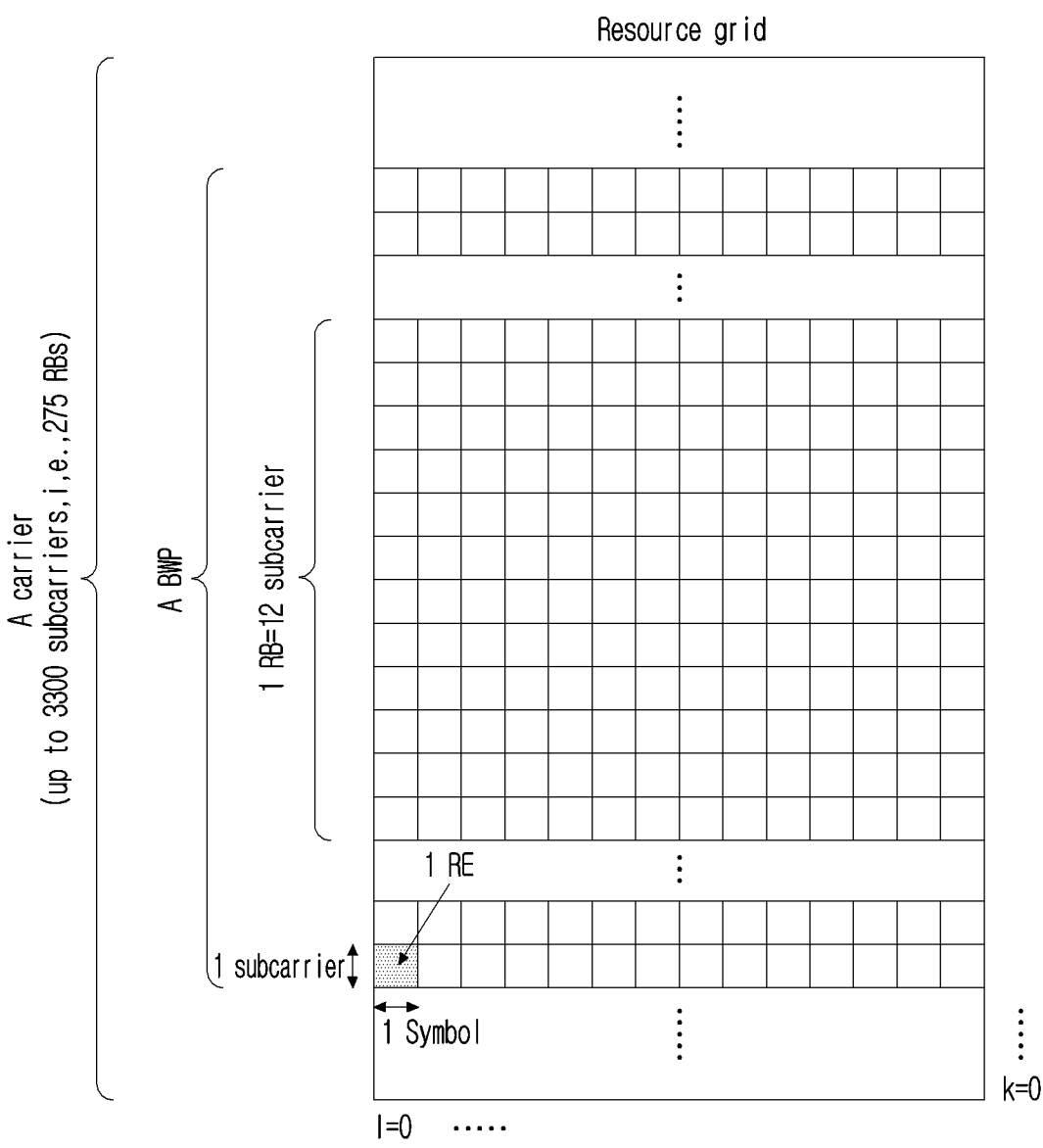
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
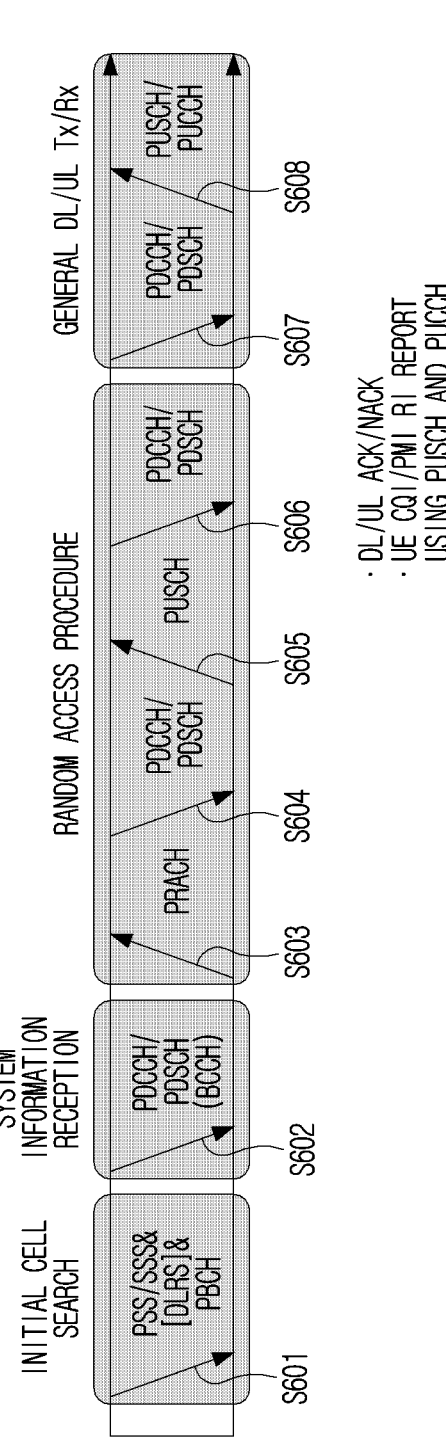
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/ PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid —Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

In addition, UE may recognize PUSCH (or PUCCH) scheduled by DCI received in different control resource sets (CORESETs)(or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, ControlResourceSet information element (IE), a higher layer parameter, is used to configure a time/frequency CORESET (control resource set). In an example, the CORESET may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/CORESET-related TCI information, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7:
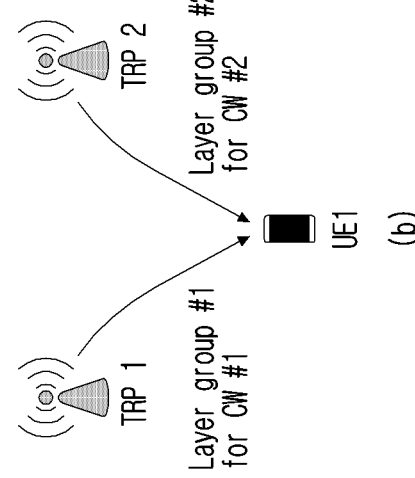
FIG. 7 illustrates a transmission method of multiple TRPs in a wireless communication system to which the present disclosure may be applied.
Figure 7:
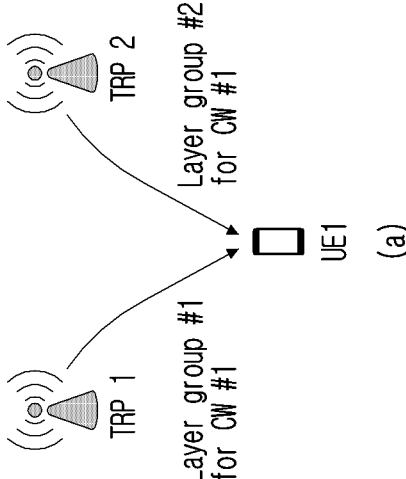

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRPs scheduled by at least one DCI may be performed as follows:

i) Scheme 1 (SDM): n (n is a natural number) TCI states in a single slot in overlapping time and frequency resource allocation Scheme 1a: Each transmission occasion is one layer or a set of layers of the same TB and each layer or layer set is associated with a set of one TCI and one DMRS port(s). A single codeword having one RV (redundancy version) is used for all layers or layer sets. With respect to a UE, different coded bits are mapped to different layers or layer sets by a specific mapping rule.

Scheme 1b: Each transmission occasion is one layer or a set of layers of the same TB and each layer or layer set is associated with a set of one TCI and one DMRS port(s). A single codeword having one RV is used for each spatial layer or layer set. RVs corresponding to each spatial layer or layer set may be the same or different.

Scheme 1c: Each transmission occasion is one layer of the same TB having one DMRS port associated with multiple TCI state indexes or one layer of the same TB having multiple DMRS ports associated with multiple TCI indexes one by one.

For the above-described scheme 1a and 1c, the same MCS is applied to all layers or layer sets.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) are associated with all non-overlapping frequency resource allocation.

Scheme 2a: A single codeword having one RV is used across whole resource allocation. From a viewpoint of UE, common RB mapping (layer mapping of a codeword) is applied across all resource allocation.

Scheme 2b: A single codeword having one RV is used for each non-overlapping frequency resource allocation. RVs corresponding to each non-overlapping frequency resource allocation may be the same or different.

For Scheme 2a, the same MCS is applied to all non-overlapping frequency resource allocation.

iii) Scheme 3 (TDM): n (n is a natural number) TCI states in a single slot in non-overlapping time resource allocation. Each transmission occasion of a TB has one TCI and one RV by time granularity of a mini-slot. All transmission occasion(s) in a slot use a common MCS as the same single or multiple DMRS port(s). A RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) use a common MCS as the same single or multiple DMRS port(s) across K slots. A RV/TCI state may be the same or different among transmission occasions.

Hybrid Automatic Repeat and Request (HARQ)

A HARQ-ACK operation is described in relation to a terminal operation for reporting control information. A HARQ in NR may have the following characteristics (hereinafter, H-1 and H-2).

H-1: HARQ-ACK feedback of 1 bit per transport block (TB) may be supported. Here, an operation of one DL HARQ process is supported for some UEs, while operation of one or more DL HARQ processes is supported for given UEs.

H-2: A UE may support a set of minimum HARQ processing time. Here, the minimum HARQ processing time means the minimum time required by a UE from receiving DL data from a base station to corresponding HARQ-ACK transmission timing. In this regard, two types of UE processing time (N1, K1) may be defined according to (1) symbol granularity and (2) slot granularity. First, from the point of view of a UE, N1 represents the number of OFDM symbols required for UE processing from the end of PDSCH reception to the earliest possible start of a corresponding HARQ-ACK transmission. The N1 may be defined as shown in Tables 6 and 7 below according to OFDM numerology (i.e., subcarrier spacing (SCS)) and DMRS patterns.

TABLE 6

| Configuration | HARQ timing parameter | Units | 15 KHz SCS | 30 KHz SCS | 60 KHz SCS | 120 KHz SCS |
|---|---|---|---|---|---|---|
| Front-loaded DMRS only | N1 | symbols | 8 | 10 | 17 | 20 |
| Front-loaded DMRS only + additional DMRS | N1 | symbols | 13 | 13 | 20 | 24 |

TABLE 7

| Configuration | HARQ timing parameter | Units | 15 KHz SCS | 30 KHz SCS | 60 KHz SCS |
|---|---|---|---|---|---|
| Front-loaded DMRS only | N1 | symbols | 3 | 4.5 | 9(FR1) |
| Front-loaded DMRS only + addition DMRS | N1 | symbols | [13] | [13] | [20] |

In addition, K1 may indicate the number of slots from a slot of a PDSCH to a slot of a corresponding HARQ-ACK transmission.

Figure 8:
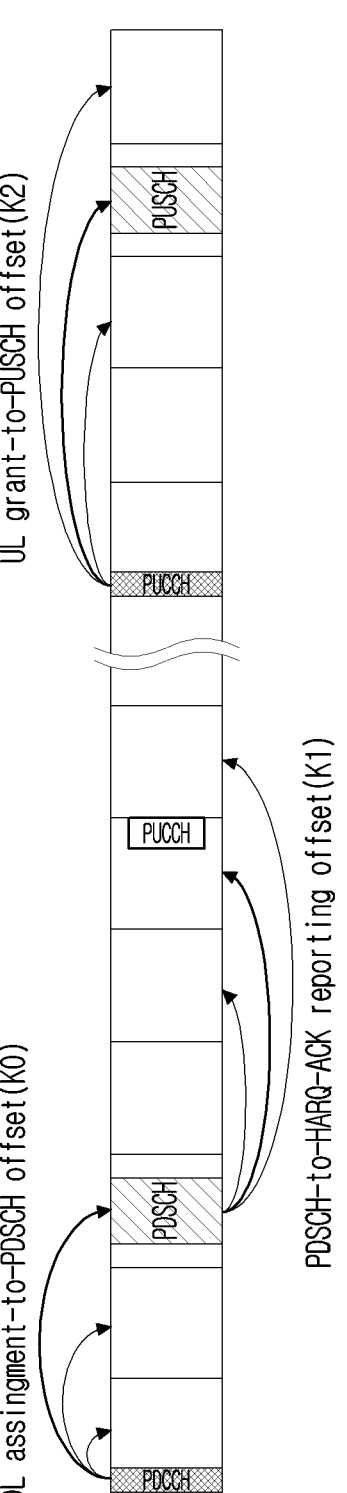
FIG. 8 is a diagram illustrating an example of HARQ-ACK timing (K1) in a wireless communication system to which the present disclosure may be applied.

FIG. 8 is a diagram illustrating an example of HARQ-ACK timing (K) in a wireless communication system to which the present disclosure may be applied.

Referring to FIG. 8, K0 represents the number of slots from a (transmitted) slot with a DL grant PDCCH to a slot with a corresponding PDSCH (i.e., PDSCH scheduled by DL grant) transmission. K2 represents the number of slots from a (transmitted) slot with a UL grant PDCCH to a slot with a corresponding PUSCH (i.e., PUSCH scheduled by UL grant) transmission. That is, K0, K1, and K2 can be briefly summarized as shown in Table 8 below.

TABLE 8

| | A | B |
|---|---|---|
| K0 | DL scheduling DCI | corresponding DL data transmission |
| K1 | DL data reception | corresponding HARQ-ACK |
| K2 | UL scheduling DCI | corresponding UL data transmission |

A slot timing between A and B is indicated by a field in DCI from the set of values. In addition, NR supports different minimum HARQ processing times between UEs. HARQ processing time includes a delay between DL data reception timing and corresponding HARQ-ACK transmission timing and a delay between UL grant reception timing and corresponding UL data transmission timing. A UE transmits its minimum HARQ processing time capability to a base station. Asynchronous and adaptive DL HARQ are supported at least in enhanced mobile broadband (eMBB) and ultra-reliable low latency (URLC).

From the point of view of a UE, HARQ ACK/NACK feedback for multiple DL transmissions in a time domain may be transmitted in one UL data/control region. A timing between DL data reception and corresponding acknowledgment is indicated by a field in DCI from the set of values, which is configured by higher layer. The timing is defined at least for the case where a timing is not known to a UE.

UE PDSCH Processing Procedure Time)

The first uplink symbol of a PUCCH carrying HARQ-ACK information starts at symbol L1, defined by a PUCCH resource to be used while including an assigned HARQ-ACK timing K1 and an effect of timing advance. Here, L1 is defined as the following uplink symbol having a cyclic prefix (CP) starting after Tproc,1=(N1+dl,1)(2048+144)·k2-μ·Tc after the end of the last symbol of a PDSCH carrying an acknowledged TB.

N1 is based on in Tables 9 and 10 below for UE processing capability, respectively. where corresponds to one of (PDCCH, PDSCH, UL) that results in the largest Tproc,1. Here, μPDCCH corresponds to subcarrier spacing of a PDCCH scheduling a PDSCH, μPDSCH corresponds to subcarrier spacing of a scheduled PDSCH, and UL corresponds to subcarrier spacing of an uplink channel on which a HARQ-ACK will be transmitted. k is predefined in the standard.

If a PDSCH DM-RS location 11 for an additional DM-RS is 11=12, N1,0=14 in Table 9 below, otherwise N1,0=13.

If a UE is configured with multiple active component carriers, the first uplink symbol carrying HARQ-ACK information includes an effect of timing difference between component carriers.

For PDSCH mapping type A, if the last symbol of a PDSCH is the i-th symbol of a slot (i<7), di,1=7−i, otherwise di,1=0.

for UE processing capability 1: if PDSCH mapping type B, and if the number of allocated PDSCH symbols is L≥7, d1,1=0, If the number of allocated PDSCH symbols is L≥4 and L≤6, then di,1=7−L.

If the number of allocated PDSCH symbols is L=3, di,1=3+min(d,l), where d is the number of overlapping symbols of a scheduling PDCCH and a scheduled PDSCH.

If the number of allocated PDSCH symbols is L=2, then dl,1=3+d, where d is the number of overlapping symbols of a scheduling PDCCH and a scheduled PDSCH.

for UE processing capability 2: if PDSCH mapping type B, and if the number of allocated PDSCH symbols is L≥7, dl,1=0, If the number of allocated PDSCH symbols is L≥3 and L≤6, dl,1 is the number of overlapping symbols of a scheduling PDCCH and a scheduled PDSCH.

if the number of allocated PDSCH symbols is L=2, if a scheduling PDCCH was within a CORESET of 3-symbols, and the CORESET and a PDSCH had the same start symbol, dl,1=3, Otherwise, dl,1 is the number of overlapping symbols of a scheduling PDCCH and a scheduled PDSCH.

For UE processing capability 2 with scheduling limitation when μPDSCH=1, if the scheduled RB allocation exceeds 136 RBs, a UE defaults to capability 1 processing time. A UE may skip decoding a number of PDSCHs with last symbol within 10 symbols before the start of a PDSCH that is scheduled to follow Capability 2, if any of those PDSCHs are scheduled with more than 136 RBs with 30 kHz SCS and following Capability 1 processing time.

For a UE that supports capability 2 on a given cell, processing time according to UE processing capability 2 is applied if the high layer parameter processingType2Enabled in PDSCH-ServingCellConfig is configured for the cell and set to enable.

If this PUCCH resource is overlapping with another PUCCH or PUSCH resource, then HARQ-ACK is multiplexed following a predefined procedure, otherwise the HARQ-ACK message is transmitted on PUCCH.

Otherwise a UE may not provide a valid HARQ-ACK corresponding to the scheduled PDSCH. A value of Tproc,1 is used both in the case of normal and extended cyclic prefix.

Table 9 illustrates the PDSCH processing time for PDSCH processing capability 1.

TABLE 9

| | PDSCH decoding time N1 [symbols] | |
|---|---|---|
| μ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | N1, 0 |
| 1 | 10 | 13 |
| 2 | 17 | 20 |
| 3 | 20 | 24 |

Table 10 illustrates the PDSCH processing time for PDSCH processing capability 2.

TABLE 10

| μ | PDSCH decoding time N1 [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | For FR, 19 |

Application Delay of the Minimum Scheduling Offset Restriction

When a UE is scheduled with DCI format 0_1 or 1_1 with a 'minimum applicable scheduling offset indicator' field, the UE determine the K0min and K2 min values to be applied. While the previously applied K0min and K2 min values are applied until the new values take effect after application delay. Change of applied minimum scheduling offset restriction indication carried by DCI in slot n, is applied in slot n+X of the scheduling cell. A UE does not expect to be scheduled with DCI format 0_1 or 1_1 with 'minimum applicable scheduling offset indicator' field indicating another change to the applied K0min or K2 min for the same active BWP before slot n+X of the scheduling cell.

When the DCI format 0_1 or 1_1 with 'minimum applicable scheduling offset indicator' field indicating a change to the applied K0min or K2 min is contained within the first three symbols of the slot, a value of application delay X is determined by, $X=\max(\text{ceil}(K0minOld \cdot 2\mu PDCCH/2\mu PDSCH), Z\mu)$ (where ceil(x) is the smallest integer not less than x). Here, K0minOld is the currently applied K0min value of the active DL BWP in the scheduled cell, and $Z\mu$ is determined by the subcarrier spacing of the active DL BWP in the scheduling cell, and given in Table 11 below. PDCCH and PDSCH are the sub-carrier spacing configurations for PDCCH and PDSCH, respectively.

When the DCI format 0_1 or 1_1 with minimum applicable scheduling offset indicator field is received outside the first three symbols of the slot, a value of $Z\mu$ from Table 11 below is incremented by one before determining the application delay X.

Table 11 illustrates the definition of $Z\mu$.

TABLE 11

| μ | $Z\mu$ |
|---|---|
| 0 | 1 |
| 1 | 1 |

TABLE 11-continued

| μ | $Z\mu$ |
|---|---|
| 2 | 2 |
| 3 | 2 |

Method for Supporting Multi-TRP (M-TRP) Transmission and Reception

In multiple TRP (mTRP) transmission based on multiple DCI (mDCI) of Rel-16, a joint HARQ-ACK codebook method has been introduced. A use case to which this method is applied may include an environment in which different TRPs are connected through an ideal backhaul.

Assuming the above use case, a repeated transmission method of different PDSCHs/PUSCHs corresponding to the same transport block (TB) based on different DCI (e.g., DCI #1/DCI #2) transmitted from different TRPs based on dynamic coordination between different TRPs may be considered. In other words, repeated transmission of different PDSCHs/PUSCHs corresponding to the same TB may be configured/indicated based on different DCI (e.g., DCI #1/DCI #2), and the different DCI (e.g., DCI #1/DCI #2) may be transmitted from different TRPs.

As described above, an operation of transmitting respective DCI from different TRPs may mean that respective DCI is transmitted from different CORSETs corresponding to different CORESET pool indexes (CORESETPoolIndex). That is, DCI 1 may be transmitted through a PDCCH received within a CORESET to which CORESETpoolIndex 1 is allocated/configured, and DCI 2 may be transmitted through a PDCCH received within a CORESET to which CORESETpoolIndex 2 is allocated/configured.

When repetitively transmitting different PDSCHs/ PUSCHs corresponding to the same TB, if respective PDSCHs/PUSCHs are scheduled based on different DCI, since respective PDSCH/PUSCH resources can be configured independently, a base station can have a high degree of freedom in configuring DL/UL resources. In addition, when compared to single DCI (sDCI) mTRP-based URLLC transmission introduced in Rel-16, since different PDCCHs can be used when scheduling multiple PDSCHs for transmission of the same TB, reliability of PDCCHs for the same TB can also be increased.

The present disclosure proposes a method for supporting repeated transmission based on multiple TRP (mTRP) transmission based on multiple DCI (mDCI) for different PDSCHs/PUSCHs corresponding to the same TB based on the above reasons.

The description of a TRP in the present disclosure is for convenience of explanation, and the proposed operation of the present disclosure is not limited thereto, and it is obvious that the description can also be interpreted in terms such as a panel/beam.

Hereinafter, in the present disclosure, for convenience of description, an example in which two TRPs perform cooperative transmission will be mainly described, but it is also applicable to a case in which two or more TRPs perform cooperative transmission.

In the present disclosure, first layer (L1: layer1) signaling may mean DCI-based dynamic signaling between a base station and a terminal. In addition, layer 2 (L2) signaling may mean higher layer signaling based on RRC/MAC control element (CE) between a base station and a terminal.

In addition, in the present disclosure, user data transmitted through PUSCH/PDSCH is referred to as a transport block (TB) for convenience of description, but the present disclosure is not limited thereto. That is, TB can be interpreted as user data transmitted from a higher layer to a physical layer.

Proposal 1: A method for configuring/indicating that PUSCHs scheduled by different DCI are based on the same TB (i.e., PUSCHs carrying the same TB)

Embodiment 1: A UE may expect to be scheduled to transmit different PUSCHs corresponding to the same TB through specific search spaces. That is, a UE can expect to receive DCI (i.e., PDCCH) scheduling transmission of different PUSCHs carrying the same TB in "specific search spaces".

The above proposed method may be used to transmit different PUSCHs corresponding to the same TB based on mDCI mTRP.

The "specific search spaces" may be defined between a base station and a UE with a fixed rule, and/or a specific search space combination may be configured/instructed to a UE based on L1/L2 signaling.

As an example of the fixed rule for defining the "specific search spaces", search spaces corresponding to different CORESETs may correspond to the "specific search spaces". And/or, search spaces (this may mean that different CORESETPoolIndexes are configured for respective CORESETs corresponding to the search spaces) corresponding to different CORESET pool indexes (CORESETPoolIndex) may correspond to the "specific search spaces". And/or, different search spaces included in a certain duration (e.g., different search spaces included in the same slot, or different search spaces in which a gap slot (/symbol) between two search spaces is less than (/equal to or less than) X (e.g., an integer value that satisfies X>0 and/or a specific value defined as a fixed rule or configured/indicated to a UE based on L1/L2 signaling) slot (/symbol), etc.) in a time domain may correspond to the "specific search spaces".

As an example of L1/L2 signaling for defining the "specific search spaces," a base station may configure/indicate a specific search space combination to a UE and/or configure/indicate whether to apply the above operation.

For example, search spaces corresponding to different CORESETs may be configured/indicated to a UE as the "specific search spaces" through L1/L2 signaling. And/or, search spaces (this may mean that different CORESET-PoolIndexes are configured for respective CORESETs corresponding to the search spaces) corresponding to different CORESETPoolIndex may be configured/indicated to a UE as the "specific search spaces" through L1/L2 signaling. And/or, different search spaces included in a certain duration (e.g., different search spaces included in the same slot, or different search spaces in which a gap slot (/symbol) between two search spaces is less than (/equal to or less than) X (e.g., an integer value that satisfies X>0 and/or a specific value defined as a fixed rule or configured/indicated to a UE based on L1/L2 signaling) slot (/symbol), etc.) in a time domain may configured/indicated to a UE as the "specific search spaces" through L1/L2 signaling.

As an example of the proposed method, different search space combinations capable of scheduling PUSCHs based on the same TB may be configured for a UE based on higher layer signaling (e.g., RRC/MAC-CE, etc.). Here, a rule may be defined so that the different search spaces correspond to different CORESETPoolIndexes and are included in the same time resource (e.g., slot). When different search spaces are configured/indicated, a UE may recognize/interpret transmission of different PUSCHs corresponding to the same TB as being scheduled.

Figure 9:
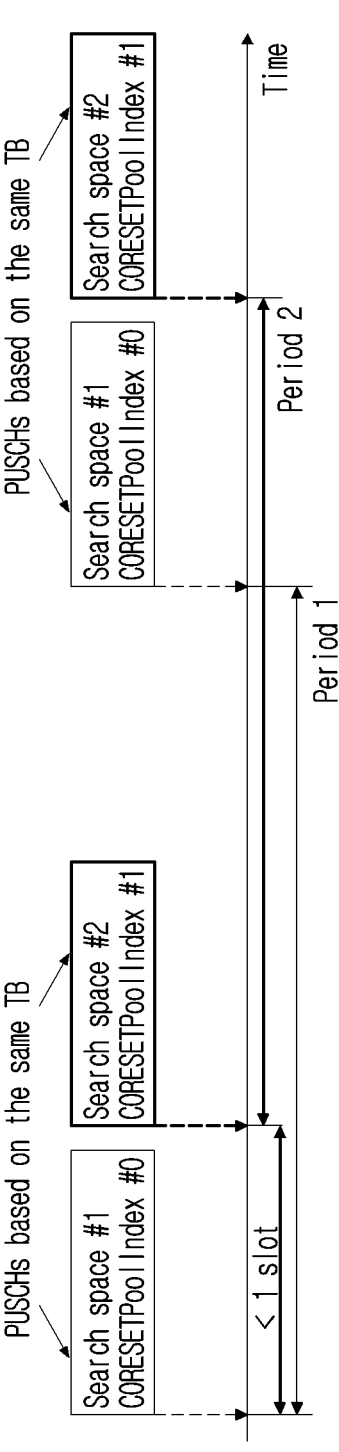
FIG. 9 is a diagram illustrating a method for defining/configuring a method of scheduling different PUSCHs based on the same TB in different DCI according to an embodiment of the present disclosure.

FIG. 9 is a diagram illustrating a method for defining/configuring a method of scheduling different PUSCHs based on the same TB in different DCI according to an embodiment of the present disclosure.

Referring to FIG. 9, a case in which different search spaces (i.e., search space #1, search space #2) in which different CORESET pool indexes (CORESETPoolIndex) are configured/allocated within a gap of 1 slot are defined/configured (i.e., by the specific rule described above or by signaling of a base station) as search spaces for DCI (i.e., PDCCH) scheduling different PUSCHs, respectively, based on the same TB is exemplified. That is, different PUSCHs scheduling by DCI received/monitored in different search spaces (i.e., search space #1, search space #2) in which different CORESET pool indexes (CORESETPoolIndex) are configured/allocated within a gap of 1 slot may carry the same TB.

In the above proposed method, a UE may expect that different PUSCHs corresponding to the same TB scheduled (i.e., by DCI (i.e., PDCCH) monitored/received within different search spaces) in different search spaces have the same HARQ process identifier (ID) value and/or the same TB size and/or the same new data indicator (NDI) and/or the same allocated bandwidth (i.e., bandwidth and/or number of resource blocks (or physical resource blocks (PRBs))). etc.) and/or the same number of allocated OFDM symbols and/or the same modulation and coding scheme (MCS) and/or the same number of transmission layers (/DMRS port number). That is, the same value as above may be indicated in different DCI scheduling different PUSCHs carrying the same TB. A more detailed description of this is as follows.

The same HARQ process ID: in order for a UE to recognize different PUSCHs corresponding to the same TB in the form of repeated transmission and to manage a HARQ entity accordingly, the same HARQ process ID may be considered. Therefore, the same HARQ process ID may be indicated for corresponding PUSCHs in different DCI scheduling different PUSCHs carrying the same TB.

The same NDI: This is to prevent erroneous operation for the same HARQ process ID even when a UE misses a specific PDCCH for different PDCCHs (e.g., PDCCH reception failure/decoding failure, etc.). When NDI values of respective PDCCHs are different values, when a UE misses a specific PDCCH of the two, since the UE cannot recognize that the PUSCH corresponding to the same TB is repetitively transmitted, the UE may erroneously determine whether the HARQ process ID is new data. Therefore, the same NDI value may be indicated for respective corresponding PUSCHs in respective DCI scheduling different PUSCHs carrying the same TB.

The same TB size, the same allocated bandwidth, the same number of allocated OFDM symbols, the same MCS and/or the same number of transport layers: In order to support repeated transmission for the same TB, a TB size recognized by a UE should have the same value. If values are different, since a UE should follow a specific TB size, dependency between different PDCCHs is required. In this case, if a UE misses a specific PDCCH, a base station may not receive both PUSCHs. Therefore, even if a UE misses a specific PDCCH among different PDCCHs, in order for a base station to receive one or more of a plurality of repeatedly transmitted PUSCHs based the received PDCCH, the above assumption can be guaranteed to a UE. Therefore, at least one of the same TB size, the same allocation bandwidth, the same number of allocated OFDM symbols, the same MCS, and/or the same transmission layer for respective corresponding PUSCHs may be allocated/indicated in different DCI scheduling different PUSCHs carrying the same TB.

The above-described method may be equivalently applied to Embodiment 2 to be described later.

Figure 10:
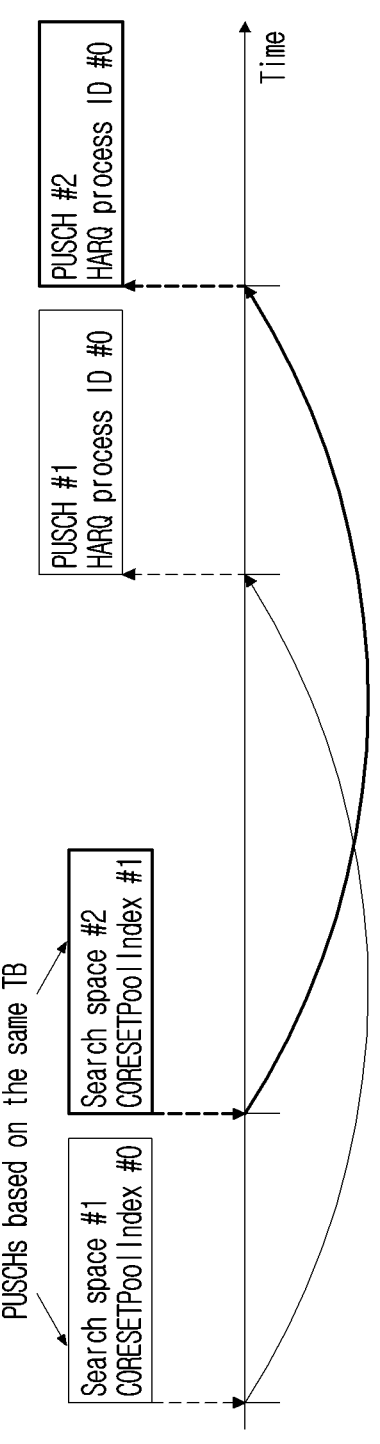
FIG. 10 is a diagram illustrating a method for defining/configuring different PUSCHs based on the same TB according to an embodiment of the present disclosure.

FIG. 10 is a diagram illustrating a method for defining/configuring different PUSCHs based on the same TB according to an embodiment of the present disclosure.

Referring to FIG. 10, a case in which different search spaces (i.e., search space #1, search space #2) in which different CORESET pool indexes (CORESETPoolIndex) are configured/allocated are defined/configured (i.e., by the specific rule described above or by signaling of a base station) as search spaces for DCI (i.e., PDCCH) scheduling different PUSCHs, respectively, based on the same TB is exemplified. That is, different PUSCHs scheduling by DCI received/monitored in different search spaces (i.e., search space #1, search space #2) in which different CORESET pool indexes (CORESETPoolIndex) are configured/allocated may carry the same TB. In addition, HARQ process IDs for different PUSCHs may be equally indicated as #0.

Alternatively, based on a PDCCH (or DCI) transmitted in a "specific search space" among different search spaces, a HARQ process ID and/or a TB size and/or an NDI (new data indicator) and/or an allocated bandwidth (i.e., bandwidth and/or number of (P)RBs, etc.) and/or a number of allocated OFDM symbols and/or an MCS and/or a number of transmission layers (/DMRS port number) may be determined.

The above "specific search space" may be defined between a base station and a UE with a fixed rule, and/or the specific search space may be configured/indicated to a UE based on L1/L2 signaling.

As an example of the fixed rule for defining the "specific search space", a search space having the lowest (or highest) search space identity (ID) may correspond to the "specific search space" space". And/or a search space corresponding to the lowest (or highest) CORESET ID may correspond to the "specific search space". And/or a search space corresponding to the lowest (or highest) CORESET pool index (CORESETPoolIndex) may correspond to the "specific search spaces".

As an example of L1/L2 signaling for defining the "specific search space," a base station may configure/indicate a specific search space to a UE and/or configure/indicate whether to apply the above operation.

For example, a search space having the lowest (or highest) search space ID may be configured/indicated to a UE as the "specific search space". And/or, a search space corresponding to the lowest (or highest) CORESET ID may be configured/indicated to a UE as the "specific search space". And/or a search space corresponding to the lowest (or highest) CORESET pool index (CORESETPoolIndex) may be configured/indicated to a UE as the "specific search space".

The above-described method may be equivalently applied to Embodiment 2 to be described later.

Embodiment 2: For a PUSCH (e.g., PUSCH #1) corresponding to (indicated by) a specific HARQ process ID, when receiving a PDCCH scheduling another PUSCH (e.g., PUSCH #2) corresponding to (indicated by) the same value as the specific HARQ process ID before the transmission time of the PUSCH, a UE may assume that the two different PUSCHs correspond to the same TB (i.e., the two PUSCHs carry the same TB). And/or, when PDCCHs (or DCI) scheduling the different PUSCHs corresponds to different CORESET pool indexes (CORESETPoolIndex) (and/or different CORESETs, and/or different search spaces (with different CORESETPoolIndex)), respectively, a UE may assume that the two different PUSCHs correspond to the same TB (i.e., the two PUSCHs carry the same TB).

The above proposed method may be used to transmit different PUSCHs corresponding to the same TB based on mDCI mTRP.

In the above proposed method, a UE can expect that respective PDCCHs (or DCI) scheduling different PUSCHs has the same new data indicator (NDI) value. That is, a UE can expect that values of NDI fields of DCI received through respective PDCCHs scheduling different PUSCHs are the same. The reason for this is to avoid causing an erroneous operation for the same HARQ process ID even when a UE misses a specific PDCCH for the different PDCCHs (e.g., PDCCH reception failure/decoding failure, etc.). If NDI values of respective PDCCHs are different values, when a UE misses a specific PDCCH of the two, since the UE cannot recognize that the PUSCHs corresponding to the same TB are repetitively transmitted, the UE may erroneously determine whether the HARQ process ID is new data. Therefore, in order to prevent this, the same NDI value may be indicated for respective corresponding PUSCHs in respective DCI scheduling different PUSCHs carrying the same TB. For example, the NDI field may be included in respective DCI, and each bit of the NDI field may correspond to one PUSCH scheduled by the corresponding DCI.

Figure 11:
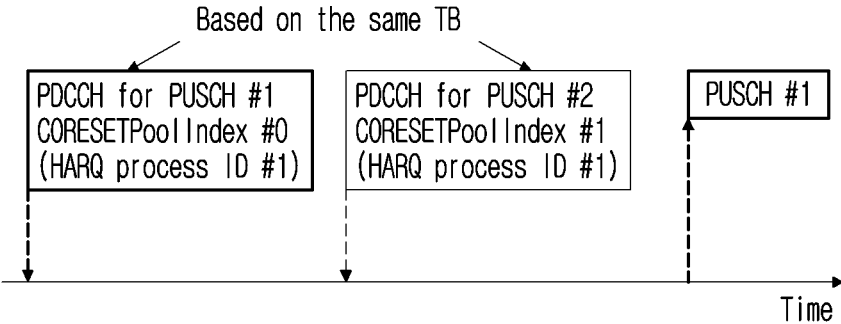
FIG. 11 is a diagram illustrating a method for defining/configuring different PUSCHs based on the same TB according to an embodiment of the present disclosure.

FIG. 11 is a diagram illustrating a method for defining/configuring different PUSCHs based on the same TB according to an embodiment of the present disclosure.

In FIG. 11, for convenience of description, it is assumed that respective PDCCHs (or DCI) scheduling different PUSCHs based on the same TB are received/monitored search spaces corresponding to different CORESET pool indexes (i.e., CORESETPoolIndex #0, CORESETPoolIndex #1), but is not necessarily required.

Referring to FIG. 11, after a PDCCH for PUSCH #1 is received from a base station, a UE may receive a PDCCH (or DCI) scheduling another PUSCH #2 before the UE transmits PUSCH #1 scheduled by the PDCCH (or DCI). Here, when the same HARQ process ID is indicated for corresponding PUSCHs in respective PDCCHs (or DCI) for two PUSCHs (i.e., PUSCH #1 and PUSCH #2), a UE may assume that the two PUSCHs are PUSCHs corresponding to the same TB. That is, a UE may assume that two PUSCHs (i.e., PUSCH #1 and PUSCH #2) are scheduled to carry the same TB.

In addition, the same new data indicator (NDI) value may be indicated for the corresponding PUSCH in respective PDCCHs (or DCI) for scheduling different PUSCHs. That is, a UE can expect in this way.

In addition, in the example of FIG. 11, the transmission time of PUSCH #2 may be before/after the transmission time of PUSCH #1 or may be the same time (e.g., the same symbol or the same slot) as the transmission time of PUSCH #1. For example, the transmission time of the PUSCH may mean a time resource region (e.g., symbol, slot, etc.) in which the PUSCH is transmitted.

Proposal 2: A method for configuring/indicating that PDSCHs scheduled in different DCI are based on the same TB (i.e., PDSCHs carrying the same TB)

Embodiment 1: A UE may expect to be scheduled to transmit different PDSCHs corresponding to the same TB through specific search spaces. That is, a UE can expect to receive DCI (i.e., PDCCH) scheduling transmission of different PDSCHs carrying the same TB in "specific search spaces".

The above proposed method may be used to transmit different PDSCHs corresponding to the same TB based on mDCI mTRP.

The "specific search spaces" may be defined between a base station and a UE with a fixed rule, and/or a specific search space combination may be configured/instructed to a UE based on L1/L2 signaling.

As an example of the fixed rule for defining the "specific search spaces", search spaces corresponding to different CORESETs may correspond to the "specific search spaces". And/or, search spaces (this may mean that different CORESETPoolIndexes are configured for respective CORESETs corresponding to the search spaces) corresponding to different CORESET pool indexes (CORESETPoolIndex) may correspond to the "specific search spaces". And/or, different search spaces included in a certain duration (e.g., different search spaces included in the same slot, or different search spaces in which a gap slot (/symbol) between two search spaces is less than (/equal to or less than) X (e.g., an integer value that satisfies X>0 and/or a specific value defined as a fixed rule or configured/indicated to a UE based on L1/L2 signaling) slot (/symbol), etc.) in a time domain may correspond to the "specific search spaces".

As an example of L1/L2 signaling for defining the "specific search spaces," a base station may configure/indicate a specific search space combination to a UE and/or configure/indicate whether to apply the above operation.

For example, search spaces corresponding to different CORESETs may be configured/indicated to a UE as the "specific search spaces" through L1/L2 signaling. And/or, search spaces (this may mean that different CORESET-PoolIndexes are configured for respective CORESETs corresponding to the search spaces) corresponding to different CORESETPoolIndex may be configured/indicated to a UE as the "specific search spaces" through L1/L2 signaling. And/or, different search spaces included in a certain duration (e.g., different search spaces included in the same slot, or different search spaces in which a gap slot (/symbol) between two search spaces is less than (/equal to or less than) X (e.g., an integer value that satisfies X>0 and/or a specific value defined as a fixed rule or configured/indicated to a UE based on L1/L2 signaling) slot (/symbol), etc.) in a time domain may configured/indicated to a UE as the "specific search spaces" through L1/L2 signaling.

As an example of the proposed method, different search space combinations capable of scheduling PDSCHs based on the same TB may be configured for a UE based on higher layer signaling (e.g., RRC/MAC-CE, etc.). Here, a rule may be defined so that the different search spaces correspond to different CORESETPoolIndexes and are included in the same time resource (e.g., slot). When different search spaces are configured/indicated, a UE may recognize/interpret transmission of different PDSCHs corresponding to the same TB as being scheduled.

Figure 12:
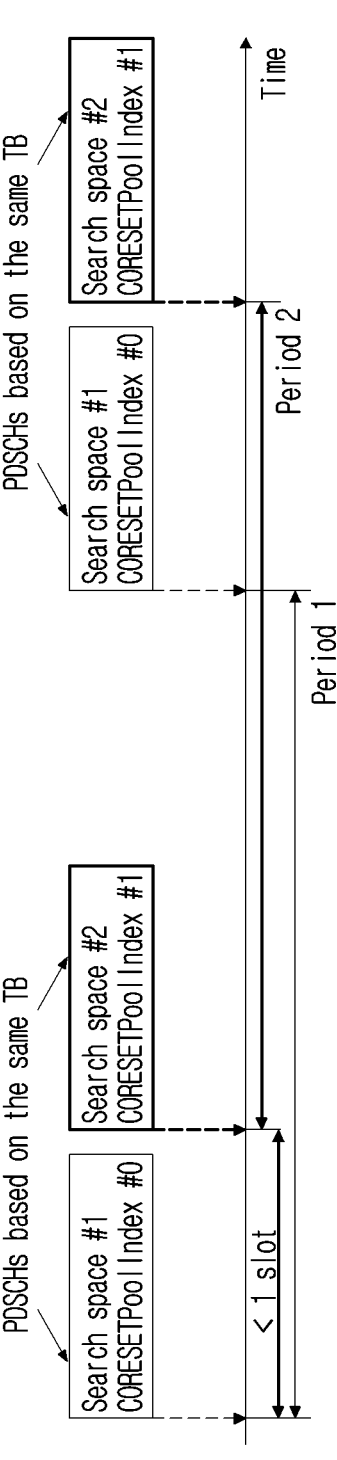
FIG. 12 is a diagram illustrating a method for defining/configuring a method of scheduling different PDSCHs based on the same TB in different DCI according to an embodiment of the present disclosure.

FIG. 12 is a diagram illustrating a method for defining/configuring a method of scheduling different PDSCHs based on the same TB in different DCI according to an embodiment of the present disclosure.

Referring to FIG. 12, a case in which different search spaces (i.e., search space #1, search space #2) in which different CORESET pool indexes (CORESETPoolIndex) are configured/allocated within a gap of 1 slot are defined/configured (i.e., by the specific rule described above or by signaling of a base station) as search spaces for DCI (i.e., PDCCH) scheduling different PDSCHs, respectively, based on the same TB is exemplified. That is, different PDSCHs scheduling by DCI received/monitored in different search spaces (i.e., search space #1, search space #2) in which different CORESET pool indexes (CORESETPoolIndex) are configured/allocated within a gap of 1 slot may carry the same TB.

In the above proposed method, a UE may expect that different PDSCHs corresponding to the same TB scheduled (i.e., by DCI (i.e., PDCCH) monitored/received within different search spaces) in different search spaces have the same HARQ process identifier (ID) value and/or the same TB size and/or the same new data indicator (NDI) and/or the same allocated bandwidth (i.e., bandwidth and/or number of resource blocks (or physical resource blocks (PRBs))). etc.) and/or the same number of allocated OFDM symbols and/or the same modulation and coding scheme (MCS) and/or the same number of transmission layers (/DMRS port number). That is, the same value as above may be indicated in different DCI scheduling different PDSCHs carrying the same TB. A more detailed description of this is as follows.

The same HARQ process ID: in order for a UE to recognize different PDSCHs corresponding to the same TB in the form of repeated transmission and to manage a HARQ entity accordingly, the same HARQ process ID may be considered. Therefore, the same HARQ process ID may be indicated for corresponding PUSCHs in different DCI scheduling different PDSCHs carrying the same TB.

The same NDI: This is to prevent erroneous operation for the same HARQ process ID even when a UE misses a specific PDCCH for different PDCCHs (e.g., PDCCH reception failure/decoding failure, etc.). When NDI values of respective PDCCHs are different values, when a UE misses a specific PDCCH of the two, since the UE cannot recognize that the PUSCH corresponding to the same TB is repetitively transmitted, the UE may erroneously determine whether the HARQ process ID is new data. Therefore, the same NDI value may be indicated for respective corresponding PDSCHs in respective DCI scheduling different PDSCHs carrying the same TB.

The same TB size, the same allocated bandwidth, the same number of allocated OFDM symbols, the same MCS and/or the same number of transport layers: In order to support repeated transmission for the same TB, a TB size recognized by a UE should have the same value. If values are different, since a UE should follow a specific TB size, dependency between different PDCCHs is required. In this case, if a UE misses a specific PDCCH, a base station may not receive both PDSCHs. Therefore, even if a UE misses a specific PDCCH among different PDCCHs, in order for a UE to receive one or more of a plurality of repeatedly transmitted PDSCHs based the received PDCCH, the above assumption can be guaranteed to a UE. Therefore, at least one of the same TB size, the same allocation bandwidth, the same number of allocated OFDM symbols, the same MCS, and/or the same transmission layer for respective corresponding PDSCHs may be allocated/indicated in different DCI scheduling different PDSCHs carrying the same TB.

The above-described method may be equivalently applied to Embodiment 2 to be described later.

Figure 13:
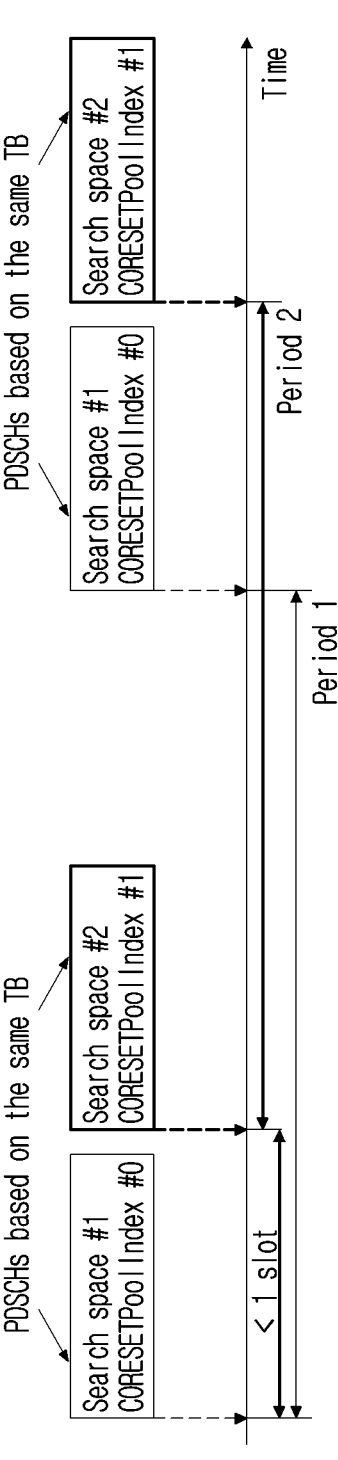
FIG. 13 is a diagram illustrating a method for defining/configuring different PDSCHs based on the same TB according to an embodiment of the present disclosure.

FIG. 13 is a diagram illustrating a method for defining/configuring different PDSCHs based on the same TB according to an embodiment of the present disclosure.

Referring to FIG. 13, a case in which different search spaces (i.e., search space #1, search space #2) in which different CORESET pool indexes (CORESETPoolIndex) are configured/allocated are defined/configured (i.e., by the specific rule described above or by signaling of a base station) as search spaces for DCI (i.e., PDCCH) scheduling different PDSCHs, respectively, based on the same TB is exemplified. That is, different PDSCHs scheduling by DCI received/monitored in different search spaces (i.e., search space #1, search space #2) in which different CORESET pool indexes (CORESETPoolIndex) are configured/allocated may carry the same TB. In addition, HARQ process IDs for different PDSCHs may be equally indicated as #0.

Alternatively, based on a PDCCH (or DCI) transmitted in a "specific search space" among different search spaces, a HARQ process ID and/or a TB size and/or an NDI (new data indicator) and/or an allocated bandwidth (i.e., bandwidth and/or number of (P)RBs, etc.) and/or a number of allocated OFDM symbols and/or an MCS and/or a number of transmission layers (/DMRS port number) may be determined.

The above "specific search space" may be defined between a base station and a UE with a fixed rule, and/or the specific search space may be configured/indicated to a UE based on L1/L2 signaling.

As an example of the fixed rule for defining the "specific search space", a search space having the lowest (or highest) search space identity (ID) may correspond to the "specific search space" space". And/or a search space corresponding to the lowest (or highest) CORESET ID may correspond to the "specific search space". And/or a search space corresponding to the lowest (or highest) CORESET pool index (CORESETPoolIndex) may correspond to the "specific search spaces".

As an example of L1/L2 signaling for defining the "specific search space," a base station may configure/indicate a specific search space to a UE and/or configure/indicate whether to apply the above operation.

For example, a search space having the lowest (or highest) search space ID may be configured/indicated to a UE as the "specific search space". And/or, a search space corresponding to the lowest (or highest) CORESET ID may be configured/indicated to a UE as the "specific search space". And/or a search space corresponding to the lowest (or highest) CORESET pool index (CORESETPoolIndex) may be configured/indicated to a UE as the "specific search space".

The above-described method may be equivalently applied to Embodiment 2 to be described later.

Embodiment 2: For a PDSCH (e.g., PDSCH #1) corresponding to (indicated by) a specific HARQ process ID, when another PDSCH (e.g., PDSCH #2) corresponding to (indicated by) the same value as the specific HARQ process ID is scheduled before HARQ-ACK transmission corresponding to the PDSCH, a UE may assume that the two different PDSCHs correspond to the same TB (i.e., the two PDSCHs carry the same TB). And/or, when PDCCHs (or DCI) scheduling the different PDSCHs corresponds to different CORESET pool indexes (CORESETPoolIndex) (and/or different CORESETs, and/or different search spaces (with different CORESETPoolIndex)), respectively, a UE may assume that the two different PDSCHs correspond to the same TB (i.e., the two PUSCHs carry the same TB).

The above proposed method may be used to transmit different PUSCHs corresponding to the same TB based on mDCI mTRP.

In the above proposed method, a UE can expect that respective PDCCHs (or DCI) scheduling different PDSCHs has the same new data indicator (NDI) value. That is, a UE can expect that values of NDI fields of DCI received through respective PDCCHs scheduling different PDSCHs are the same. The reason for this is to avoid causing an erroneous operation for the same HARQ process ID even when a UE misses a specific PDCCH for the different PDCCHs (e.g., PDCCH reception failure/decoding failure, etc.). If NDI values of respective PDCCHs are different values, when a UE misses a specific PDCCH of the two, since the UE cannot recognize that the PDSCHs corresponding to the same TB are repetitively transmitted, the UE may erroneously determine whether the HARQ process ID is new data. Therefore, in order to prevent this, the same NDI value may be indicated for respective corresponding PDSCHs in respective DCI scheduling different PDSCHs carrying the same TB. For example, the NDI field may be included in respective DCI, and each bit of the NDI field may correspond to one PDSCH scheduled by the corresponding DCI.

Figure 14:
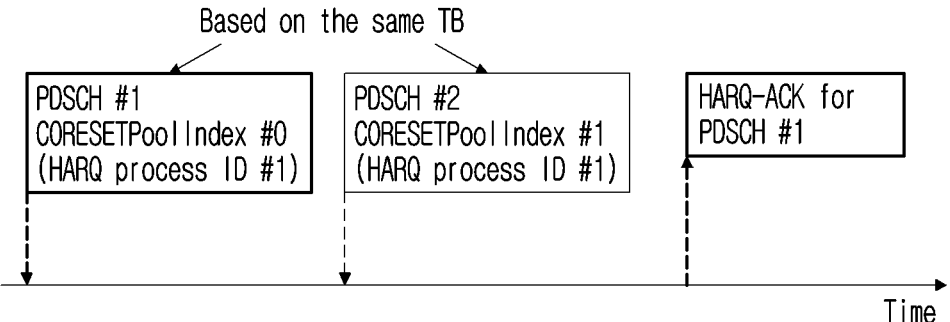
FIG. 14 is a diagram illustrating a method for defining/configuring different PDSCHs based on the same TB according to an embodiment of the present disclosure.

FIG. 14 is a diagram illustrating a method for defining/configuring different PDSCHs based on the same TB according to an embodiment of the present disclosure.

In FIG. 14, for convenience of description, it is assumed that respective PDCCHs (or DCI) scheduling different PDSCHs based on the same TB are received/monitored search spaces corresponding to different CORESET pool indexes (i.e., CORESETPoolIndex #0, CORESETPoolIndex #1), but is not necessarily required.

Referring to FIG. 14, after PDSCH #1 is received from a base station, a UE may receive another PDSCH #2 before the UE transmits a HARQ-ACK for PUSCH #1. Here, when the same HARQ process ID is indicated for corresponding PDSCHs in respective PDCCHs (or DCI) for two PDSCHs (i.e., PDSCH #1 and PDSCH #2), a UE may assume that the two PDSCHs are PDSCHs corresponding to the same TB. That is, a UE may assume that two PDSCHs (i.e., PDSCH #1 and PDSCH #2) are scheduled to carry the same TB.

In addition, the same new data indicator (NDI) value may be indicated for the corresponding PDSCH in respective PDCCHs (or DCI) for scheduling different PDSCHs. That is, a UE can expect in this way.

In addition, in the example of FIG. 14, the transmission time of a HARQ-ACK for PDSCH #2 may be before/after the transmission time of a HARQ-ACK for PDSCH #1 or may be the same time (e.g., the same symbol or the same slot) as the transmission time of a HARQ-ACK for PDSCH #1. For example, the transmission time of the HARQ-ACK for may mean a time resource region (e.g., symbol, slot, etc.) in which the HARQ-ACK is transmitted.

Proposal 3: Method for speeding up transmission time of a HARQ-ACK when PDSCHs scheduled in different DCI are based on the same TB (i.e., PDSCHs carrying the same TB)

In the current standard, a PDSCH processing procedure time is a value defined to ensure a minimum time for a UE to process a PDSCH before transmission time of a HARQ-ACK in relation to transmission time of a PDSCH and an HARQ-ACK corresponding to the PDSCH (see UE PDSCH processing procedure time). Meanwhile, if different PDSCHs corresponding to the same TB can be transmitted to a UE according to the embodiment proposed in proposal 2 above, the proposed method below can be applied for utilizing different PDSCHs repeatedly transmitted at the earliest HARQ-ACK transmission time.

However, the embodiment proposed in the above proposal 2 in the present disclosure is not limited to the only condition for applying the proposed method. The embodiment of proposal 2 can be one example of a method for transmitting different PDSCHs corresponding to the same TB, and the proposed method can also be applied when different PDSCHs are transmitted based on this purpose. The example below shows other embodiments that can be considered together with proposal 2.

For example, to configure/indicate repeated transmission of the same TB, a packet ID (in L1/L2/L3 signaling) may be used. That is, it may be configured/indicated that the same TB is repeatedly transmitted through different PDSCHs through the same packet ID. As another example, a RNTI may be used to configure/indicate repeated transmission of the same TB. That is, different PDSCHs scheduled by DCI with a CRC masked by the same specific RNTI are configured/indicated to carry the same TB.

Embodiment 1: an offset value for transmission time (e.g., n2) of a HARQ-ACK corresponding to another PDSCH (e.g., PDSCH #1) corresponding to the same TB as the PDSCH compared to transmission time (e.g., n1) of a specific PDSCH (e.g., PDSCH #2) may be defined to be at least X+alpha [e.g., symbols] or more (/exceed).

In the above proposal, transmission time (e.g., n1) of a specific PDSCH (e.g., PDSCH #2) may be defined to be after the end of the last symbol of the PDSCH (e.g., when the last symbol of the PDSCH ends) point), and transmission time (e.g., n2) of a HARQ-ACK may be defined as the time corresponding to the first symbol of a PUCCH transmitting the HARQ-ACK.

In the above proposal, X may mean a PDSCH processing procedure time for transmitting a valid HARQ-ACK message for the PDSCH after receiving the PDSCH (e.g., PDSCH #2).

For example, in the above proposal, an alpha value may be an integer greater than or equal to 0, or may be defined as a fixed rule, or may be configured/indicated to a UE based on L1/L2 signaling and/or a report value of the UE (e.g., UE capability, etc.). The alpha value may mean a minimum value of additional time required for a UE to perform decoding based on (soft) combining on different PDSCHs corresponding to the same TB.

When transmission time of PDSCH #2 is determined based on the above proposal, since a HARQ-ACK feedback value can be determined based on repeated transmission of different PDSCHs before HARQ-ACK transmission time of PDSCH #1, it may have the advantage of being able to quickly apply the result of repeated transmission to the HARQ-ACK feedback.

Figure 15:
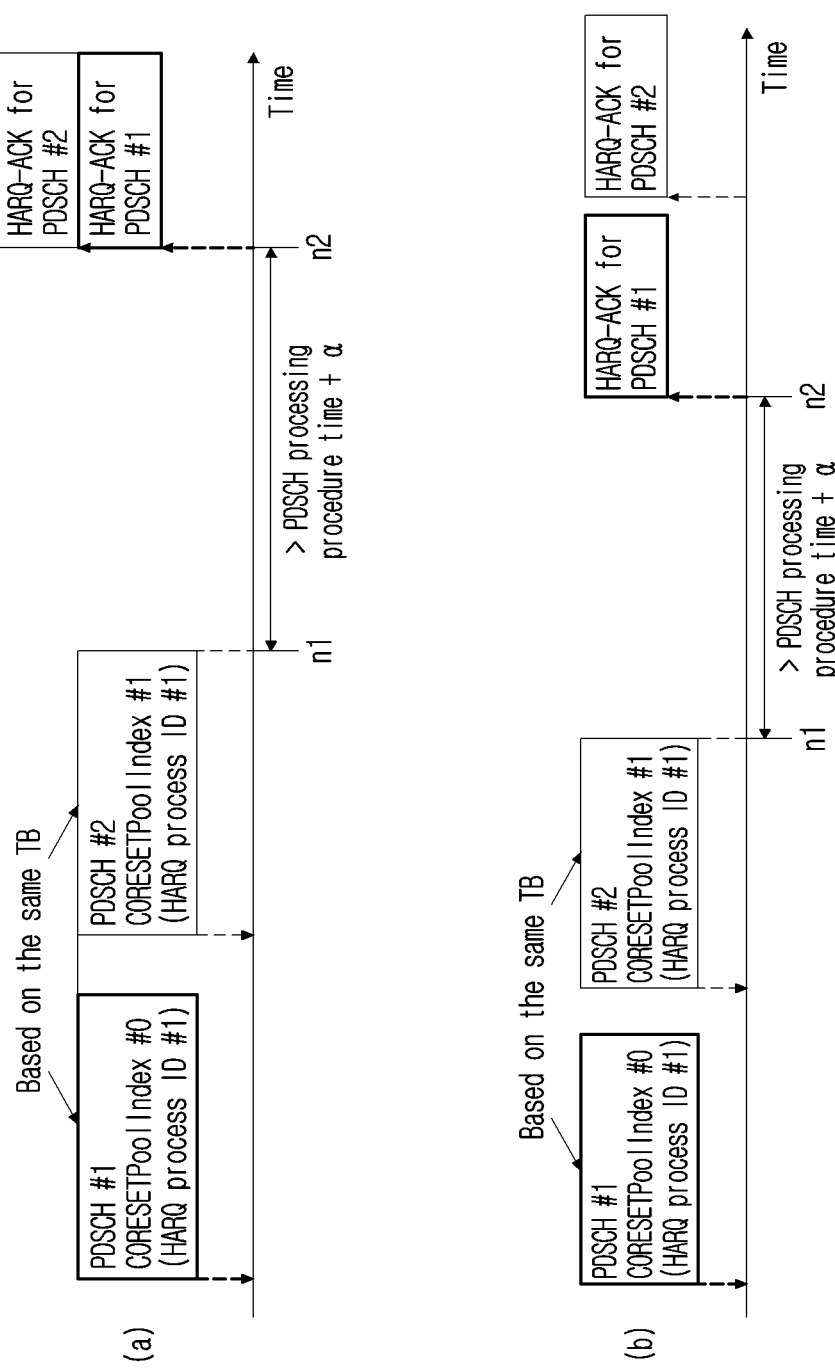
FIG. 15 is a diagram illustrating transmission timing of a HARQ-ACK for different PDSCHs corresponding to the same TB according to an embodiment of the present disclosure.

FIG. 15 is a diagram illustrating transmission timing of a HARQ-ACK for different PDSCHs corresponding to the same TB according to an embodiment of the present disclosure.

Referring to FIG. 15, a case in which an offset value for transmission time (n2) of a HARQ-ACK corresponding to PDSCH #1 compared to transmission time (n1) of PDSCH #2 is configured to be equal to or greater than (or exceeded) PDSCH processing procedure time+alpha is exemplified.

FIG. 15(a) exemplifies an example of feeding back HARQ-ACKs corresponding to different PDSCHs at the same time. In other words, in FIG. 15(a), a case in which HARQ-ACK information corresponding to different PDSCHs is transmitted by a joint HARQ-ACK codebook or each HARQ-ACK information is transmitted at the same time (e.g., same symbol/same slot/same time resource) is exemplified. In the above example, it is possible to have the advantage that two different PDSCHs can be used for decoding of the same TB before transmission time of a joint HARQ-ACK codebook.

For example, based on a higher layer field for configuring a physical cell group (i.e., 'PhysicalCellGroupConfig') used to configure a cell-group specific L1 parameter, a specific HARQ-ACK codebook method may be configured/indicated. In other words, a parameter (e.g., higher layer parameter 'ackNackFeedbackMode' for ACK/NACK feedback mode) for configuring a HARQ-ACK codebook method may be included in the 'PhysicalCellGroupConfig' field, a joint HARQ-ACK codebook or a separate HARQ-ACK codebook may be indicated through the parameter. For example, the parameter may be configured when a plurality of different CORESET pool indexes (CORESETPoolindex) exist in a control resource set (CORESET: ControlResource-Set).

FIG. 15(b) exemplifies an example of feeding back HARQ-ACKs in an order corresponding to transmission time point of PDSCH. According to FIG. 15(b), before HARQ-ACK transmission time of PDSCH #1 prior to HARQ-ACK transmission time of PDSCH #2, it is possible to have an advantage of being able to use both of two different PDSCHs for TB decoding.

Figure 16:
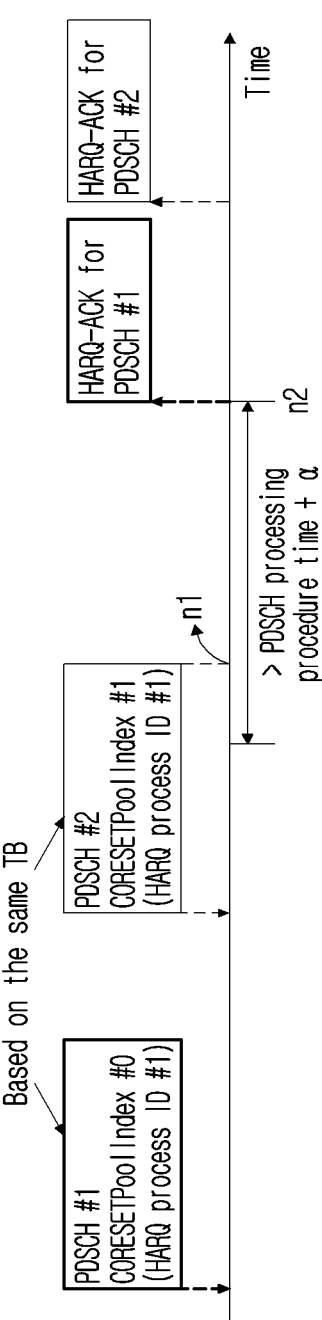
FIG. 16 is a diagram illustrating transmission timing of a HARQ-ACK for different PDSCHs corresponding to the same TB when the present disclosure is not applied.

FIG. 16 is a diagram illustrating transmission timing of a HARQ-ACK for different PDSCHs corresponding to the same TB when the present disclosure is not applied.

The example of FIG. 16 shows an example of a case where PDSCH #2 cannot be utilized for TB decoding at transmission time of a HARQ-ACK for PDSCH #1. In the example of FIG. 16, when transmitting a HARQ-ACK corresponding to PDSCH #1, sufficient time is not given to perform decoding together using PDSCH #2, so an effect cannot be reflected in repeated transmission during HARQ-ACK transmission. In addition, only when transmitting HARQ-ACK corresponding to PDSCH #2, information on two different PDSCHs may be used to reflect a repeated transmission effect during HARQ-ACK transmission. Therefore, in this case, in order to improve TB decoding performance through repeated transmission, there is a disadvantage in that HARQ-ACK feedback that can reflect this may be delayed.

As another example for achieving the purpose of the above-described proposed method, an offset value for transmission time (e.g., n2) of a HARQ-ACK corresponding to the PDSCH (e.g., PDSCH #2) compared to transmission time (e.g., n1) of a specific PDSCH (e.g., PDSCH #2) may be defined to be at least X+alpha [e.g., symbols] or more (/exceed). Here, an alpha value may be defined in the same way as the above proposal. HARQ-ACK feedback may be advanced by transmitting a HARQ-ACK corresponding to a PDSCH (e.g., PDSCH #2) transmitted later in a time domain ahead of a HARQ-ACK corresponding to a PDSCH transmitted earlier (e.g., PDSCH #1), this is because even in this case, additional time required to perform decoding based on (soft) combining for different PDSCHs can be considered.

Figure 17:
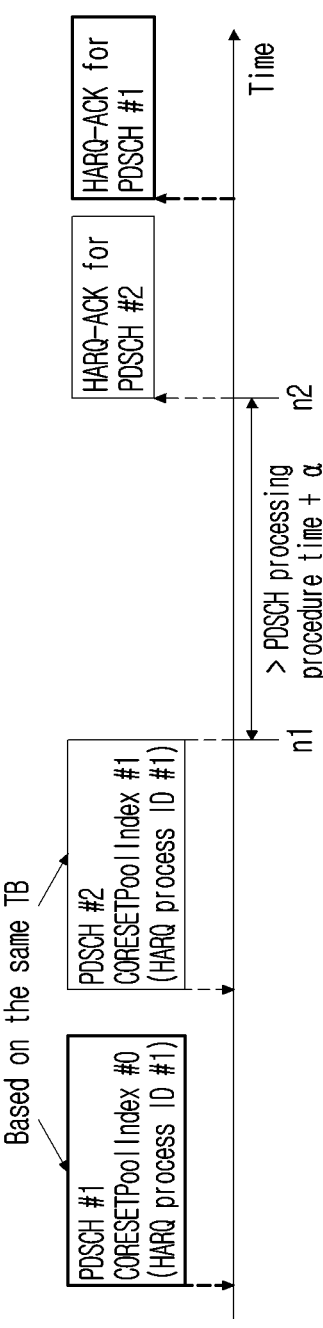
FIG. 17 is a diagram illustrating transmission timing of a HARQ-ACK for different PDSCHs corresponding to the same TB according to an embodiment of the present disclosure.

FIG. 17 is a diagram illustrating transmission timing of a HARQ-ACK for different PDSCHs corresponding to the same TB according to an embodiment of the present disclosure.

Referring to FIG. 17, a case in which an offset value for transmission time (n2) of a HARQ-ACK corresponding to PDSCH #2 compared to transmission time (n1) of PDSCH #2 is configured to be equal to or greater than (or exceeded) PDSCH processing procedure time+alpha is exemplified.

In the example of FIG. 17, from the point of view of a UE, after receiving PDSCH #2 received later, decoding based on (soft) combining is performed using both PDSCH #1/PDSCH #2, and the corresponding result may be reflected in HARQ-ACK transmission for PDSCH #2. Therefore, a UE can quickly feed back the result of repeated transmission to a base station.

On the other hand, if a HARQ-ACK for PDSCH #2 is transmitted during PDSCH processing procedure time based on the existing standard, decoding based on (soft) combining cannot be performed for different PDSCHs. Therefore, there is a disadvantage in that feedback may be delayed until time of a HARQ-ACK corresponding to PDSCH #1 because an effect of repeated transmission cannot be reflected when transmitting a HARQ-ACK for PDSCH #2.

As a result, when the above proposed method is applied, by defining the minimum time required until the PDSCH and a HARQ-ACK corresponding to the PDSCH when considering repeated transmission, it is possible to have an advantage of advancing the HARQ-ACK feedback timing considering an effect of repeated transmission as much as possible according to capability of a UE.

Proposal 4: Additional proposed method for Proposal 1 and/or Proposal 2

In the present disclosure, for transmission/reception of 'a plurality of PDSCHs/PUSCHs corresponding to the same TB', in respective DCI, different MCSs, modulation orders, and/or time/frequency allocation sizes may be indicated (according to channel conditions for each TRP and corresponding UE). In this case, to repeatedly receive/transmit the same TB, a UE may expect to receive resource allocations and MCS indications from respective DCI so that a TB size transmitted on a first PDSCH/PUSCH and a TB size transmitted on a second (and/or N (>1)-th) PDSCH/PUSCH are the same. For example, from the perspective of a TRP, TRP1 transmitting a TB on a first PDSCH/PUSCH may indicate resource allocation and MCS indication of DCI so that a TB size is same as a TB transmitted by TRP2 on a second (and/or N (>1)-th) PDSCH/PUSCH.

Alternatively, a scheduling method corresponding to different TB sizes for respective PDSCH/PUSCH may be supported for more flexible scheduling according to the traffic situation of each TRP. In this case, TBs received/transmitted on respective PDSCHs/PUSCHs may be recognized as different TBs from the perspective of a physical layer. However, by including an indicator that the corresponding data packets correspond to the same data packet (or some segment(s) of the same data packet) in a packet header, etc. in a higher layer, operations such as selection, automatic repeat and request (ARQ), segmentation, combining, omission, and/or addition of data packets received/transmitted from each TB may be performed. For example, if a size of a first TB is smaller than a size of a second TB, it is a duplicate packet, but an indicator indicating that it corresponds to some segments may be included (e.g., in a packet header). Here, the 'packet' is a data transmission unit defined in a specific layer (e.g., PDCP, RLC, MAC) (e.g., protocol data unit (PDU), service data unit (SDU) unit)).

Figure 18:
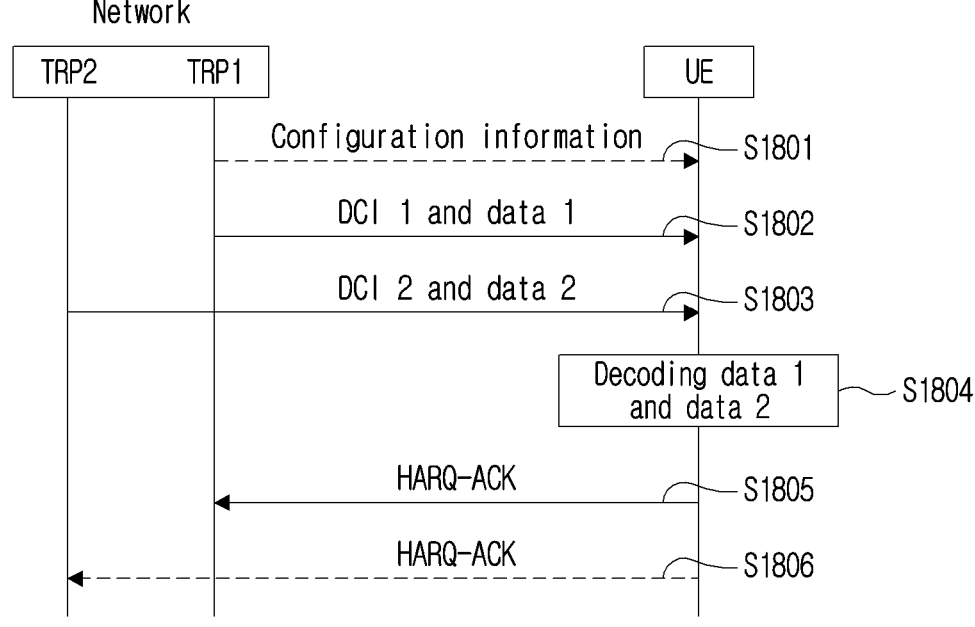
FIG. 18 and FIG. 19 illustrate a signaling procedure between a network and a terminal according to an embodiment of the present disclosure.
Figure 19:
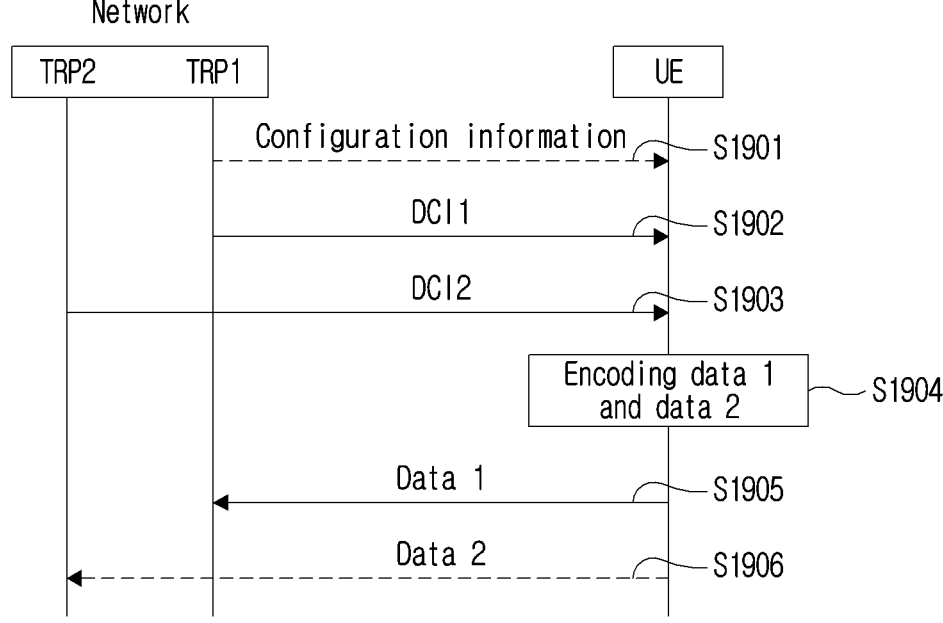

FIG. 18 and FIG. 19 illustrate a signaling procedure between a network and a terminal according to an embodiment of the present disclosure.

FIG. 18 and FIG. 19 exemplify signaling between a network (e.g., TRP 1 and TRP 2) and a terminal (i.e., UE) in a situation of multiple TRPs (i.e., M-TRP, or multiple cells, all TRPs below can be substituted with cells) to which the proposed methods (e.g., Proposal 1/Proposal 2/Proposal 3/Proposal 4, etc.) in the present disclosure may be applied.

Here, a UE/Network is only an example, and may be applied to various devices as described in FIG. 22 to be described later. FIG. 18 and FIG. 19 are only for convenience of description and do not limit the scope of the present disclosure. In addition, some step(s) shown in FIG. 18 and FIG. 19 may be omitted depending on situations and/or configurations.

In reference to FIG. 18 and FIG. 19, for convenience of a description, signaling between 2 TRPs and UE is considered, but a corresponding signaling method may be extended and applied to signaling between multiple TRPs and multiple UEs. In the following description, a network may be one base station including a plurality of TRPs or may be one cell including a plurality of TRPs. In an example, an ideal/a non-ideal backhaul may be configured between TRP 1 and TRP 2 configuring a network. In addition, the following description is described based on multiple TRPs, but it may be equally extended and applied to transmission through multiple panels. In addition, in the present disclosure, an operation that a terminal receives a signal from TRP1/TRP2 may be interpreted/described (or may be an operation) as an operation that a terminal receives a signal from a network (through/with TRP1/2) and an operation that a terminal transmits a signal to TRP1/TRP2 may be interpreted/described (or may be an operation) as an operation that a terminal transmits a signal to a network (through/with TRP1/TRP2) or may be inversely interpreted/described.

In addition, as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., an index, an identifier (ID)). In an example, when one UE is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, a base station may generally mean an object which performs transmission and reception of data with a UE. For example, the base station may be a concept including one or more transmission points (TPs), one or more transmission and reception points (TRPs), etc. Also, the TP and/or the TRP may include a panel of a base station, a transmission and reception unit, etc.

In addition, as described above, TRPs may be classified according to information (e.g., index, ID) on a CORESET pool (or CORESET group). For example, TRPs may be classified according to CORESETPoolIndex. For example, when one UE is configured to transmit/receive with multiple TRPs (or cells), this may mean that multiple CORESET pools (or CORESET groups) are configured for one UE. Configuration for CORESET may be performed through higher layer signaling (e.g., RRC signaling, etc.).

Specifically, FIG. 18 shows signaling when a UE receives multiple DCI (i.e., when a network transmits DCI to a UE through/using each TRP) in an M-TRP situation (or cell, all TRP below can be substituted with cells/panels, or even if multiple CORESET (/CORESET group) is configured from one TRP, it can be assumed to be M-TRP).

A UE may receive configuration information related to multiple TRP-based transmission and reception through/ using TRP 1 (and/or TRP 2) from a network (S1801). The configuration information may include information related to network configuration (i.e., TRP configuration), resource allocation related to transmission and reception based on multiple TRPs, etc. In this case, the configuration information may be transmitted through higher layer signaling (e.g., RRC signaling, MAC-CE, etc.). In addition, when the configuration information is defined or configured in advance, the corresponding step may be omitted.

For example, the configuration information may include CORESET-related configuration information (e.g., ControlResourceSet IE) as described in the above-described methods (e.g., proposal 1/proposal 2/proposal 3/proposal 4, etc.). The CORESET-related configuration information may include a CORESET-related ID (e.g., controlResourceSetID), a CORESET pool index (e.g., CORESETPoolIndex) for a CORESET, time/frequency resource configuration of a CORESET, and TCI information related to a CORESET. The CORESET pool index (e.g., CORESETPoolIndex) may mean a specific index (e.g., CORESET group index, HARQ codebook index) mapped/configured to each CORESET.

For example, the configuration information may include a parameter (e.g., ackNackFeedbackMode) for configuring a HARQ-ACK codebook method, and a joint HARQ-ACK codebook or a separate HARQ-ACK codebook may be indicated through the parameter.

For example, the configuration information may include configurations related to PDCCH/PDSCH/PUCCH/configurations related to HARQ-ACK transmission.

For example, as described in the above-described methods (e.g., proposal 1/proposal 2/proposal 3/proposal 4, etc.), the configuration information may include information that configure/indicate that PDSCHs/PUSCHs scheduled by different DCI are based on the same TB.

For example, an operation in which a UE (100/200 in FIG. 22) in step S1801 receives the configuration information related to transmission and reception based on the Multiple TRP from a network (100/200 in FIG. 22) may be implemented by an apparatus of FIG. 22 to be described below. For example, referring to FIG. 22, one or more processors 102 may control one or more transceivers 106 and/or one or more memories 104 to receive the configuration information related to transmission and reception based on the Multiple TRP, and one or more transceivers 106 may receive the configuration information related to transmission and reception based on the multiple TRP from a network.

A UE may receive DCI 1 and data 1 scheduled by the DCI 1 through/using TRP 1 from a network (S1802). In addition, the UE may receive DCI 2 and data 2 scheduled by the DCI 2 through/using TRP 2 from the network (S1803). For example, as described in the above method (e.g., proposal 1/proposal 2/proposal 3/proposal 4, etc.), the DCI 1 and/or the DCI 2 is transmitted and received through a PDCCH, and may include scheduling information on a PDSCH for transmission and reception of the Data 1 and/or the Data 2. In addition, DCI (e.g., DCI 1 and DCI 2) and data (e.g., Data 1 and Data 2) may be transmitted through a control channel (e.g., PDCCH, etc.) and a data channel (e.g., PDSCH, etc.), respectively. Also, steps S1802 and S1803 may be performed simultaneously, or one may be performed earlier than the other.

For example, as described in the methods described above (e.g., proposal 1/proposal 2/proposal 3/proposal 4, etc.), the DCI 1 and/or the DCI 2 may include information configuring/indicating that PDSCHs/PUSCHs scheduled by respective DCI are based on the same TB. For example, transmission of different PDSCHs corresponding to the same TB may be scheduled based on the DCI 1 and/or the DCI 2. For example, the DCI 1 and/or the DCI 2 may include an NDI field/TB related field/HARQ process related field/PUCCH resource indicator (PRI) field/HARQ-ACK related timing information, etc. For example, when data 1 and data 2 correspond to the same TB, each DCI may indicate resource allocation (time/frequency) and a MCS so that a TB size is the same.

For example, for PDSCHs corresponding to the same HARQ process ID (e.g., the HARQ process IDs corresponding to data 1 and data 2 are the same), when data 2 is scheduled before HARQ-ACK transmission corresponding to the data 1, a UE may assume that data 1 and data 2 correspond to the same TB. For example, when the data 1 and the data 2 are the same TB that is repeatedly received (through PDSCH), different PDSCHs corresponding to the same TB have the same HARQ process ID and/or the same TB size and/or the same NDI and/or the same allocated bandwidth (i.e., bandwidth/number of (P)RBs, etc.) and/or the same number of allocated OFDM symbols and/or the same MCS and/or the same number of transmission layers (/DMRS port number) values. For example, whether respective TBs correspond to the same data packet may be indicated based on packet headers of respective TBs corresponding to respective data.

For example, PDCCH 1 carrying DCI 1 and PDCCH 2 carrying DCI 2 may be associated with different CORESETs having different control resource set (CORESET) pool indexes. Data 2 (i.e., a second PDSCH) may be received before a UE transmits HARQ-ACK information for data 1 (i.e., a first PDSCH). In this case, based on the same HARQ process identifier (ID) for the data 1 (i.e., a first PDSCH) and the data 2 (i.e., second PDSCH), the data 1 (i.e., a first PDSCH) and the data 2 (i.e., a second PDSCH) may correspond to the same TB.

In addition, PDCCH 1 carrying DCI 1 and PDCCH 2 carrying DCI 2 may be transmitted in a first search space and a second search space determined by a predetermined rule/ configuration or higher layer signaling, respectively. For example, when different search spaces are included within a predetermined time duration in a time domain, the first search space and the second search space may be determined by the predetermined configuration. As described above, at least one of the same TB size, the same frequency resource size, the same time resource size, and the same modulation and coding scheme (MCS) and/or the same number of transmission layers may be allocated for data 1 (i.e., a first PDSCH) and data 2 (second PDSCH). Here, at least one of the same TB size, the same frequency resource size, the same time resource size, the same MCS and/or the same number of transmission layers may be determined based on a PDCCH received in a specific search space among a first search space and a second search space. Here, a specific search space may be determined based on any one of a search space identifier, a CORESET identifier, and a CORESET pool index, or may be determined by higher layer signaling.

For example, the operation of receiving the DCI 1 and/or the DCI 2, the data 1 and/or the data 2 from a network (100/200 in FIG. 22) by a UE (100/200 in FIG. 22) in steps S1802 and S1803 described above may be implemented by a device of FIG. 22 to be described below. For example, referring to FIG. 22, one or more processors 102 control one or more transceivers 106 and/or one or more memories 104 to receive DCI 1 and/or DCI 2, data 1 and/or data 2, and one or more transceivers 106 may receive the DCI 1 and/or the DCI 2, the data 1 and/or the data 2 from a Network.

A UE may decode data 1 and/or data 2 received through/using TRP 1 and/or TRP 2 from a network (S1804). For example, a UE may perform channel estimation and/or data decoding based on the above-described methods (e.g., proposal 1/proposal 2/proposal 3/proposal 4, etc.).

For example, the above-described operation of decoding data 1 and data 2 by a UE (100/200 in FIG. 22) in step S1804 may be implemented by a device of FIG. 22 to be described below. For example, referring to FIG. 22, one or more processors 102 may control decoding of data 1 and data 2.

A UE may transmit HARQ-ACK information (e.g., ACK information, NACK information, etc.) for data 1 and/or data 2 to a Network through/using TRP 1 and/or TRP 2 (S1805, S1806). In this case, HARQ-ACK information for data 1 and data 2 may be combined into one. In addition, a UE is configured to transmit only HARQ-ACK information to a representative TRP (e.g., TRP 1), and transmission of HARQ-ACK information to another TRP (e.g., TRP 2) may be omitted.

For example, the HARQ-ACK information may be configured based on the above-described methods (e.g., proposal 1/proposal 2/proposal 3/proposal 4, etc.). For example, transmission time of the HARQ-ACK information may be determined based on the above-described proposal 3, etc.

For example, the HARQ-ACK information for data 1 and the HARQ-ACK information for data 2 may be transmitted at the same time (e.g., the same symbol or the same slot) in a time domain, or at different time (e.g., different symbols or different slots).

For example, the operation in which a UE (100/200 in FIG. 22) transmits the HARQ-ACK information to a network (100/200 in FIG. 22) in steps S1805 and S1806 described above may implemented by a device of FIG. 22. For example, referring to FIG. 22, one or more processors 102 may control one or more transceivers 106 and/or one or more memories 104 to transmit DCI 1 and/or DCI 2 and the HARQ-ACK information, and one or more transceivers 106 may transmit the HARQ-ACK information to a network.

Specifically, FIG. 19 shows signaling when a UE receives multiple DCI (i.e., when a network transmits DCI to a UE through/using respective TRP) in an M-TRP (or cells, below all TRP can be replaced by cell/panel, or even if multiple CORESET (/CORESET group) is configured from one TRP, it can be assumed to be an M-TRP) situation.

A UE may receive configuration information related to multiple TRP-based transmission and reception through/using TRP 1 (and/or TRP 2) from a network (S1901). The configuration information may include information related to network configuration (i.e., TRP configuration), resource allocation related to transmission and reception based on multiple TRPs, etc. In this case, the configuration information may be transmitted through higher layer signaling (e.g., RRC signaling, MAC-CE, etc.). In addition, when the configuration information is defined or configured in advance, the corresponding step may be omitted.

For example, the configuration information may include CORESET-related configuration information (e.g., ControlResourceSet IE) as described in the above-described methods (e.g., proposal 1/proposal 2/proposal 3/proposal 4, etc.). The CORESET-related configuration information may include a CORESET-related ID (e.g., controlResourceSetID), a CORESET pool index (e.g., CORESETPoolIndex) for a CORESET, time/frequency resource configuration of a CORESET, and TCI information related to a CORESET. The CORESET pool index (e.g., CORESETPoolIndex) may mean a specific index (e.g., CORESET group index, HARQ codebook index) mapped/configured to each CORESET.

For example, the configuration information may include a parameter (e.g., ackNackFeedbackMode) for configuring a HARQ-ACK codebook method, and a joint HARQ-ACK codebook or a separate HARQ-ACK codebook may be indicated through the parameter. For example, the configuration information may include configurations related to PDCCH/PDSCH/PUCCH/configurations related to HARQ-ACK transmission.

For example, as described in the above-described methods (e.g., proposal 1/proposal 2/proposal 3/proposal 4, etc.), the configuration information may include information that configure/indicate that PDSCHs/PUSCHs scheduled by different DCI are based on the same TB.

For example, an operation in which a UE (100/200 in FIG. 22) in step S1901 receives the configuration information related to transmission and reception based on the Multiple TRP from a network (100/200 in FIG. 22) may be implemented by an apparatus of FIG. 22 to be described below. For example, referring to FIG. 22, one or more processors 102 may control one or more transceivers 106 and/or one or more memories 104 to receive the configuration information related to transmission and reception based on the Multiple TRP, and one or more transceivers 106 may receive the configuration information related to transmission and reception based on the multiple TRP from a network.

A UE may receive DCI 1 through/using TRP 1 from a network (S1902). In addition, the UE may receive DCI 2 through/using TRP 2 from a network (S1903). In addition, DCI (e.g., DCI 1 and DCI 2) may be transmitted through a control channel (e.g., PDCCH, etc.), respectively. Also, steps S1901 and S1902 may be performed simultaneously, or one may be performed earlier than the other.

For example, as described in the methods described above (e.g., proposal 1/proposal 2/proposal 3/proposal 4, etc.), the DCI 1 and/or the DCI 2 may include information configuring/indicating that PDSCHs/PUSCHs scheduled by respective DCI are based on the same TB. For example, transmission of different PUSCHs corresponding to the same TB may be scheduled based on the DCI 1 and/or the DCI 2. For example, the DCI 1 and/or the DCI 2 may include an NDI field/TB related field/HARQ process related field/PUCCH resource indicator (PRI) field/HARQ-ACK related timing information, scheduling information of an uplink channel (e.g., PUCCH/PUSCH), etc. Respective DCI may indicate resource allocation and MCS so that a TB size is the same.

For example, the operation of receiving the DCI 1 and/or the DCI 2 from a network (100/200 in FIG. 22) by a UE (100/200 in FIG. 22) in steps S1902 and S1903 described above may be implemented by a device of FIG. 22 to be described below. For example, referring to FIG. 22, one or more processors 102 control one or more transceivers 106 and/or one or more memories 104 to receive DCI 1 and/or DCI 2. and one or more transceivers 106 may receive the DCI 1 and/or the DCI 2 from a Network.

For example, PDCCH 1 carrying DCI 1 and PDCCH 2 carrying DCI 2 may be associated with different CORESETs having different control resource set (CORESET) pool indexes. In addition, PDCCH 2 may be received before a UE transmits first data (i.e., a first PUSCH scheduled by a first PDCCH) after reception time of a PDCCH 1. In this case, based on the same HARQ process identifier (ID) for the data 1 (i.e., a first PUSCH) and the data 2 (i.e., a second PUSCH), the data 1 (i.e., a first PUSCH) and the Data 2 (i.e., a second PUSCH) may correspond to the same TB.

In addition, PDCCH 1 carrying DCI 1 and PDCCH 2 carrying DCI 2 may be transmitted in a first search space and a second search space determined by a predetermined rule/configuration or higher layer signaling, respectively. For example, when different search spaces are included within a predetermined time duration in a time domain, the first search space and the second search space may be determined by the predetermined configuration. As described above, at least one of the same TB size, the same frequency resource size, the same time resource size, and the same modulation and coding scheme (MCS) and/or the same number of transmission layers may be allocated for data 1 (i.e., a first PUSCH) and data 2 (second PUSCH). Here, at least one of the same TB size, the same frequency resource size, the same time resource size, the same MCS and/or the same number of transmission layers may be determined based on a PDCCH received in a specific search space among a first search space and a second search space. Here, a specific search space may be determined based on any one of a search space identifier, a CORESET identifier, and a CORESET pool index, or may be determined by higher layer signaling.

A UE may encode data 1 and/or data 2 (S1904). For example, a UE may perform channel estimation and/or data encoding based on the above-described methods (e.g., proposal 1/proposal 2/proposal 3/proposal 4, etc.).

For example, the above-described operation of encoding data 1 and data 2 by a UE (100/200 in FIG. 22) in step S1904 can be implemented by a device of FIG. 22 to be described below. For example, referring to FIG. 22, one or more processors 102 may control encoding operations of the data 1 and the data 2.

A UE may transmit data 1 to a network through/using TRP 1 (S1905). In addition, the UE may transmit data 2 to a network through/using TRP 2 (S1906). Also, data (e.g., DATA 1/DATA 2) may be transmitted through respective data channels (e.g., PUSCH, etc.). Also, steps S1905 and S1906 may be performed simultaneously, or one may be performed earlier than the other.

For example, as described in the above-described methods (e.g., proposal 1/proposal 2/proposal 3/proposal 4, etc.), the data 1 and/or the data 2 may be scheduled based on the DCI 1 and/or the DCI 2.

For example, for PUSCHs corresponding to the same HARQ process ID (e.g., the HARQ process IDs corresponding to data 1 and data 2 are the same), when data 2 is scheduled (when a PDCCH scheduling data 2 is received) before transmission of the data 1, a UE may assume that data 1 and data 2 correspond to the same TB. For example, when the data 1 and the data 2 are the same TB that is repeatedly received (through PUSCH), different PUSCHs corresponding to the same TB have the same HARQ process ID and/or the same TB size and/or the same NDI and/or the same allocated bandwidth (i.e., bandwidth/number of (P)RBs, etc.) and/or the same number of allocated OFDM symbols and/or the same MCS and/or the same number of transmission layers (/DMRS port number) values. For example, whether respective TBs correspond to the same data packet may be indicated based on packet headers of respective TBs corresponding to respective data.

Although not shown in FIG. 19, a UE may receive HARQ-ACK information (e.g., ACK information, NACK information, etc.) for data 1 and/or data 2 from a network through/using TRP 1 and/or TRP 2. In this case, HARQ-ACK information for data 1 and data 2 may be combined into one. In addition, a UE is configured to receive only HARQ-ACK information from a representative TRP (e.g., TRP 1), and reception of HARQ-ACK information from another TRP (e.g., TRP 2) may be omitted.

For example, the HARQ-ACK information may be configured based on the above-described methods (e.g., proposal 1/proposal 2/proposal 3/proposal 4, etc.). For example, transmission time of the HARQ-ACK information may be determined based on the above proposal 3, etc.

For example, the operation in which a UE (100/200 in FIG. 22) transmits the data 1 and/or the data 2 to a network (100/200 in FIG. 22) in the above steps S1905 and S1906 may be implemented by a device of FIG. 22 to be described below. For example, referring to FIG. 22, one or more processors 102 may control one or more transceivers 106 and/or one or more memories 104 to transmit data 1 and/or data 2, and one or more transceivers 106 may transmit the data 1 and/or the data 2 to a network.

As mentioned above, the above-described signaling and operation of Network/UE (e.g., proposal 1/proposal 2/proposal 3/proposal 4/FIG. 18/FIG. 19, etc.) may be implemented by a device to be described below (e.g., FIG. 22). For example, a network (e.g., TRP 1/TRP 2) may correspond to a first wireless device, and a UE may correspond to a second wireless device, and vice versa.

Figure 22:
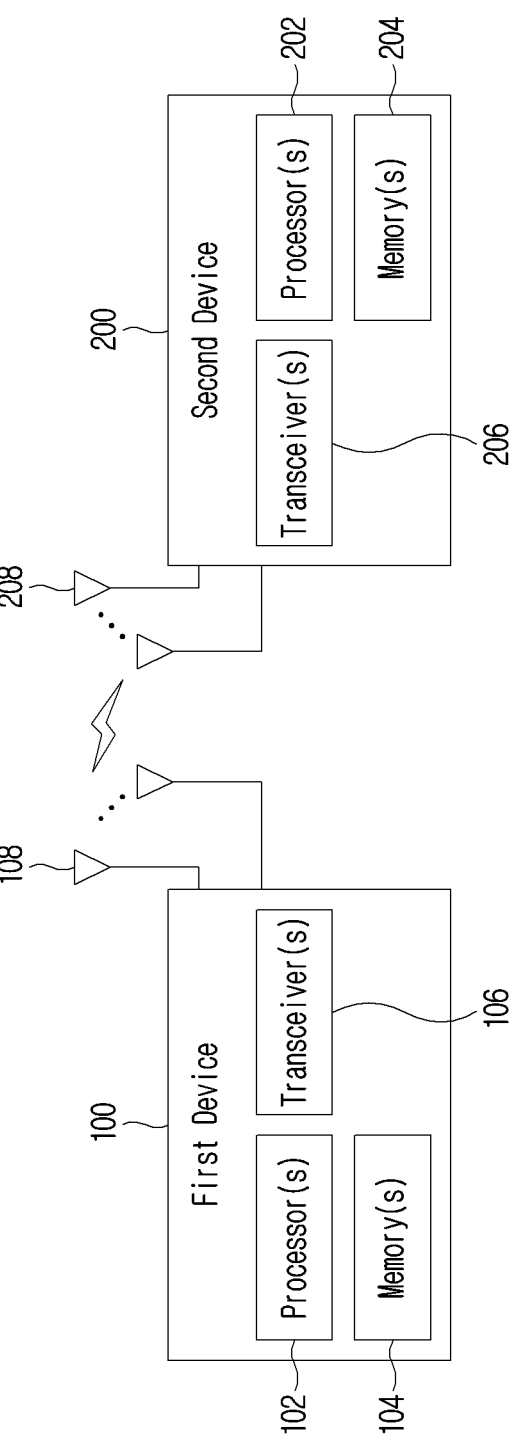
FIG. 22 illustrates a block diagram of a wireless communication device according to an embodiment of the present disclosure.

As mentioned above, the above-described signaling and operation of Network/UE (e.g., proposal 1/proposal 2/proposal 3/proposal 4/FIG. 18/FIG. 19, etc.) may be processed by one or more processors (102, 202) of FIG. 22, and the above-described signaling and operation of Network/UE (e.g., proposal 1/proposal 2/proposal 3/proposal 4/FIG. 18/FIG. 19, etc.) may be stored in a memory (e.g., one or more memories (104, 204) of FIG. 22) in a form of an instruction/program (e.g., instructions, executable code) for driving at least one processor (e.g., 102, 202) of FIG. 22.

Figure 20:
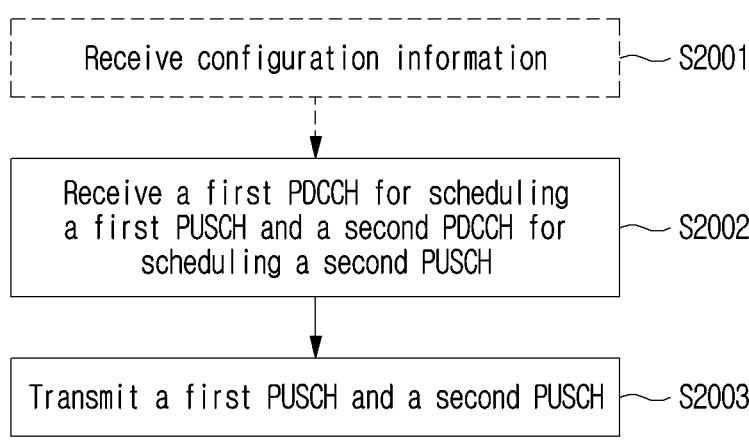
FIG. 20 illustrates an operation of a terminal for transmitting a PUSCH according to an embodiment of the present disclosure.

FIG. 20 illustrates an operation of a terminal for transmitting a PUSCH according to an embodiment of the present disclosure.

FIG. 20 illustrates an operation of a terminal based on the proposed methods (e.g., proposal 1/proposal 2/proposal 3/proposal 4, etc.). The example of FIG. 20 is for convenience of description and does not limit the scope of the present disclosure. Some step(s) illustrated in FIG. 20 may be omitted depending on circumstances and/or configurations. In addition, a terminal in FIG. 20 is only one example, and may be implemented as a device illustrated in FIG. 22 below. For example, the processor (102/202) of FIG. 22 may control transmission and reception of channels/signals/data/information using a transceiver (106/206) and may control to store transmitted or received channels/signals/data/information in the memory (104/204).

In addition, the operation of FIG. 20 may be processed by one or more processors (102, 202) of FIG. 22. In addition, the operation of FIG. 20 may be stored in a memory (e.g., one or more memories (104, 204) of FIG. 22) in a form of an instruction/program (e.g., instructions, executable code) for driving at least one processor (e.g., 102, 202) of FIG. 22.

A terminal may receive configuration information related to multiple TRP-based transmission and reception from a network (S2001).

The configuration information may include information related to network configuration (i.e., TRP configuration), resource allocation related to transmission and reception based on multiple TRPs, etc. In this case, the configuration information may be transmitted through higher layer signaling (e.g., RRC signaling, MAC-CE (control information), etc.). In addition, when the configuration information is defined or configured in advance, the corresponding step may be omitted.

For example, the configuration information may include configuration information related to MTRP transmission described in the above-described proposed methods (e.g., proposal 1/proposal 2/proposal 3/proposal 4, etc.). For example, the configuration information includes configuration information for a CORESET/CORESET group (or pool) related to the base station/TCI state-related configuration information associated with each TRP (or spatial relation information associated with each TRP).

For example, as described in the above methods (e.g., proposal 1/proposal 2/proposal 3/proposal 4, etc.), the configuration information may include information configuring/indicating that PUSCHs scheduled by different DCI are based on the same TB.

A terminal receives a first PDCCH for scheduling a first PUSCH and a second PDCCH for scheduling a second PUSCH from a network (S2002).

A first PDCCH may be transmitted from a first TRP, and a second PDCCH may be transmitted from a second TRP. In other words, a first PDCCH and a second PDCCH may be associated with different CORESETs having different CORESET pool indices. In addition, a first PDCCH and a second PDCCH may be transmitted simultaneously, or one may be transmitted earlier than the other.

For example, as described in the above methods (e.g., proposal 1/proposal 2/proposal 3/proposal 4, etc.), the DCI 1 (i.e., transmitted on a first PDCCH) and/or the DCI 2 (i.e., transmitted on a second PDCCH) may include information configuring/indicating that PUSCHs scheduled by respective DCI are based on the same TB. For example, transmission of different PUSCHs corresponding to the same TB may be scheduled based on the DCI 1 and/or the DCI 2.

For example, when the second PDCCH is received after reception time of the first PDCCH and before transmitting the first PUSCH, and when HARQ process IDs for the first PUSCH and the second PUSCH are the same, the first PUSCH and the second PUSCH may correspond to the same transport block (TB). That is, if the same HARQ process IDs are indicated in DCI (i.e., transmitted on a first PDCCH) for scheduling a first PUSCH and DCI (i.e., transmitted on a second PDCCH) for scheduling a second PUSCH, the same TB may be transmitted through the first PUSCH and the second PUSCH.

In addition, the same NDI value may be allocated to a first PUSCH and a second PUSCH by DCI (i.e., transmitted on a first PDCCH) for scheduling a first PUSCH and DCI (i.e., transmitted on a second PDCCH) for scheduling a second PUSCH.

In addition, PDCCH 1 carrying DCI 1 and PDCCH 2 carrying DCI 2 may be transmitted in a first search space and a second search space, respectively, determined by a predetermined rule/configuration, etc. or by higher layer signaling. For example, when different search spaces are included within a predetermined time duration in a time domain, the first search space and the second search space may be determined by the predetermined configuration. As described above, at least one of the same TB size, the same frequency resource size, the same time resource size, and the same modulation and coding scheme (MCS) and/or the same number of transmission layers may be allocated for a first PUSCH and a second PUSCH. Here, at least one of the same TB size, the same frequency resource size, the same time resource size, the same MCS and/or the same number of transmission layers may be determined based on a PDCCH received in a specific search space among a first search space and a second search space. Here, a specific search space may be determined based on any one of a search space identifier, a CORESET identifier, and a CORESET pool index, or may be determined by higher layer signaling.

A terminal transmits a first PUSCH and a second PUSCH to a network (S2003). That is, a terminal may transmit a first PUSCH based on first DCI (transmitted through a first PDCCH) and transmit a second PUSCH based on second DCI (transmitted through a second PDCCH).

A first PUSCH may be transmitted to a first TRP, and a second PUSCH may be transmitted to a second TRP. Here, a first PUSCH and a second PUSCH may carry the same TB as described above. In addition, a first PUSCH and a second PUSCH may be transmitted at the same time or different time in a time domain.

In addition, although not shown in FIG. 20, a terminal may receive HARQ-ACK information (e.g., ACK information, NACK information, etc.) for a first PUSCH and/or a second PUSCH from a network through/using TRP 1 and/or TRP 2. In this case, HARQ-ACK information for a first PUSCH and a second PUSCH may be combined into one. In addition, a UE is configured to receive only HARQ-ACK information from a representative TRP (e.g., TRP 1), and reception of HARQ-ACK information from another TRP (e.g., TRP 2) may be omitted.

For example, the HARQ-ACK information may be configured based on the above-described methods (e.g., proposal 1/proposal 2/proposal 3/proposal 4, etc.). For example, transmission time of the HARQ-ACK information may be determined based on the above proposal 3, etc.

Figure 21:
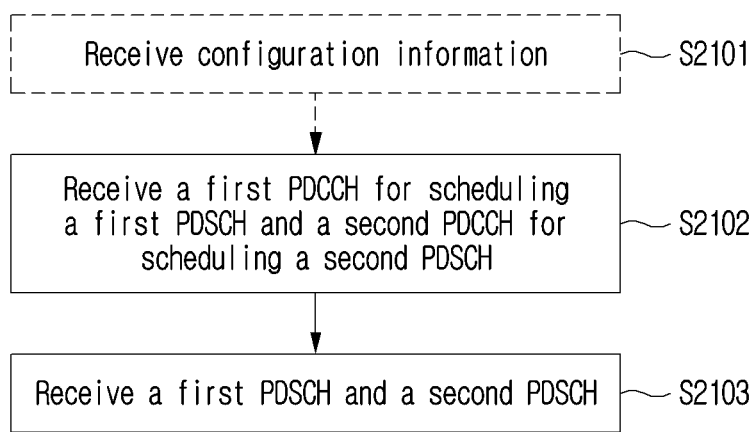
FIG. 21 illustrates an operation of a terminal for receiving a PDSCH according to an embodiment of the present disclosure.

FIG. 21 illustrates an operation of a terminal for receiving a PDSCH according to an embodiment of the present disclosure.

FIG. 21 illustrates an operation of a terminal based on the proposed methods (e.g., proposal 1/proposal 2/proposal 3/proposal 4, etc.). The example of FIG. 21 is for convenience of description and does not limit the scope of the present disclosure. Some step(s) illustrated in FIG. 21 may be omitted depending on circumstances and/or configurations. In addition, a terminal in FIG. 21 is only one example, and may be implemented as a device illustrated in FIG. 22 below. For example, the processor (102/202) of FIG. 22 may control transmission and reception of channels/signals/data/information using a transceiver (106/206) and may control to store transmitted or received channels/signals/data/information in the memory (104/204).

In addition, the operation of FIG. 21 may be processed by one or more processors (102, 202) of FIG. 22. In addition, the operation of FIG. 21 may be stored in a memory (e.g., one or more memories (104, 204) of FIG. 22) in a form of an instruction/program (e.g., instructions, executable code) for driving at least one processor (e.g., 102, 202) of FIG. 22.

A terminal may receive configuration information related to multiple TRP-based transmission and reception from a network (S2101).

The configuration information may include information related to network configuration (i.e., TRP configuration), resource allocation related to transmission and reception based on multiple TRPs, etc. In this case, the configuration information may be transmitted through higher layer signaling (e.g., RRC signaling, MAC-CE (control information), etc.). In addition, when the configuration information is defined or configured in advance, the corresponding step may be omitted.

For example, the configuration information may include configuration information related to MTRP transmission described in the above-described proposed methods (e.g., proposal 1/proposal 2/proposal 3/proposal 4, etc.). For example, the configuration information includes configuration information for a CORESET/CORESET group (or pool) related to the base station/TCI state-related configuration information associated with each TRP (or spatial relation information associated with each TRP).

For example, as described in the above methods (e.g., proposal 1/proposal 2/proposal 3/proposal 4, etc.), the configuration information may include information configuring/indicating that PUSCHs scheduled by different DCI are based on the same TB.

A terminal receives a first PDCCH for scheduling a first PDSCH and a second PDCCH for scheduling a second PDSCH from a network (S2102).

A first PDCCH may be transmitted from a first TRP, and a second PDCCH may be transmitted from a second TRP. In other words, a first PDCCH and a second PDCCH may be associated with different CORESETs having different CORESET pool indices. In addition, a first PDCCH and a second PDCCH may be transmitted simultaneously, or one may be transmitted earlier than the other.

For example, as described in the above methods (e.g., proposal 1/proposal 2/proposal 3/proposal 4, etc.), the DCI 1 (i.e., transmitted on a first PDCCH) and/or the DCI 2 (i.e., transmitted on a second PDCCH) may include information configuring/indicating that PDSCHs scheduled by respective DCI are based on the same TB. For example, transmission of different PDSCHs corresponding to the same TB may be scheduled based on the DCI 1 and/or the DCI 2.

For example, when a second PDSCH is received before a terminal transmits HARQ-ACK information for a first PDSCH (i.e., when scheduled by PDCCH 2), and based on the same HARQ process identifier (ID) for a first PDSCH and a second PDSCH, a first PDSCH and a second PDSCH may correspond to the same TB. That is, if the same HARQ process IDs are indicated in DCI (i.e., transmitted on a first PDCCH) for scheduling a first PDSCH and DCI (i.e., transmitted on a second PDCCH) for scheduling a second PDSCH, the same TB may be transmitted through the first PDSCH and the second PDSCH.

In addition, the same NDI value may be allocated to a first PDSCH and a second PDSCH by DCI (i.e., transmitted on a first PDCCH) for scheduling a first PDSCH and DCI (i.e., transmitted on a second PDCCH) for scheduling a second PDSCH.

In addition, PDCCH 1 carrying DCI 1 and PDCCH 2 carrying DCI 2 may be transmitted in a first search space and a second search space, respectively, determined by a predetermined rule/configuration, etc. or by higher layer signaling. For example, when different search spaces are included within a predetermined time duration in a time domain, the first search space and the second search space may be determined by the predetermined configuration. As described above, at least one of the same TB size, the same frequency resource size, the same time resource size, and the same modulation and coding scheme (MCS) and/or the same number of transmission layers may be allocated for a first PDSCH and a second PDSCH. Here, at least one of the same TB size, the same frequency resource size, the same time resource size, the same MCS and/or the same number of transmission layers may be determined based on a PDCCH received in a specific search space among a first search space and a second search space. Here, a specific search space may be determined based on any one of a search space identifier, a CORESET identifier, and a CORESET pool index, or may be determined by higher layer signaling.

A terminal receives a first PDSCH and a second PDSCH from a network (S2103). That is, a terminal may receive a first PDSCH based on first DCI (transmitted through a first PDCCH) and receive a second PDSCH based on second DCI (transmitted through a second PDCCH).

A first PDSCH may be received from a first TRP, and a second PDSCH may be received from a second TRP. Here, a first PDSCH and a second PDSCH may carry the same TB as described above. In addition, a first PDSCH and a second PDSCH may be transmitted at the same time or different time in a time domain.

In addition, although not shown in FIG. 21, a terminal may transmit HARQ-ACK information (e.g., ACK information, NACK information, etc.) for a first PDSCH and/or a second PDSCH to a network through/using TRP 1 and/or TRP 2.

In this case, HARQ-ACK information for a first PDSCH and a second PDSCH may be combined into one. In addition, a UE is configured to transmit only HARQ-ACK information from a representative TRP (e.g., TRP 1), and transmission of HARQ-ACK information to another TRP (e.g., TRP 2) may be omitted.

For example, the HARQ-ACK information may be configured based on the above-described methods (e.g., proposal 1/proposal 2/proposal 3/proposal 4, etc.). For example, transmission time of the HARQ-ACK information may be determined based on the above proposal 3, etc.

For example, the HARQ-ACK information for a first PDSCH and the HARQ-ACK information for a second PDSCH may be transmitted at the same time (e.g., the same symbol or the same slot) in a time domain, Alternatively, it may be transmitted at different time (e.g., different symbols or different slots).

General Device to which the Present Disclosure May be Applied

FIG. 22 is a diagram which illustrates a block diagram of a wireless communication device according to an embodiment of the present disclosure.

In reference to FIG. 22, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206.

One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:

receiving, by a terminal, a first physical downlink control channel (PDCCH) for scheduling a first physical uplink shared channel (PUSCH) and a second PDCCH for scheduling a second PUSCH; and transmitting, by the terminal, the first PUSCH and the second PUSCH, wherein the first PDCCH and the second PDCCH are associated with different control resource sets having different control resource set pool indexes, wherein the second PDCCH is received before transmitting the first PUSCH after receiving the first PDCCH, wherein based on the same hybrid automatic repeat and request (HARQ) process identifier (ID) for the first PUSCH and the second PUSCH, the first PUSCH and the second PUSCH correspond to the same transport block, and wherein based on individual scheduling indicated for the first PUSCH and the second PUSCH by the first PDCCH and the second PDCCH, different resource allocation sizes and different modulation and coding schemes (MCS) are indicated so that sizes of transport blocks respectively corresponding to the first PUSCH and the second PUSCH are identical.

2. The method of claim 1, wherein the same new data indicator (NDI) value is allocated to the first PUSCH and the second PUSCH.

3. The method of claim 1, wherein the first PUSCH and the second PUSCH are transmitted at the same time or different time in a time domain.

4. The method of claim 1, wherein the first PDCCH and the second PDCCH are received in a first search space and a second search space determined by a predetermined configuration or higher layer signaling, respectively.

5. The method of claim 4, wherein when different search spaces are included within a predetermined time interval in a time domain, the first search space and the second search space are determined by the predetermined configuration.

6. The method of claim 4, wherein the same number of transmission layers is allocated for the first PUSCH and the second PUSCH.

7. The method of claim 6, wherein based on a PDCCH received in a specific search space among the first search space and the second search space, the same number of transmission layers is determined.

8. The method of claim 7, wherein the specific search space is determined based on one of a search space identifier, a CORESET identifier and a CORESET pool index or determined by higher layer signaling.

9. A terminal comprising:

at least one transceiver for transmitting and receiving a wireless signal;

at least one processor for controlling the at least one transceiver; and at least one memory connected to the at least one processor and storing instructions that, when executed by the at least one processor, perform operations comprising:

receiving a first physical downlink control channel (PDCCH) for scheduling a first physical uplink shared channel (PUSCH) and a second PDCCH for scheduling a second PUSCH; and transmitting the first PUSCH and the second PUSCH, wherein the first PDCCH and the second PDCCH are associated with different control resource sets having different control resource set pool indexes, wherein the second PDCCH is received before transmitting the first PUSCH after receiving the first PDCCH, wherein based on the same hybrid automatic repeat and request (HARQ) process identifier (ID) for the first PUSCH and the second PUSCH, the first PUSCH and the second PUSCH correspond to the same transport block, and wherein based on individual scheduling indicated for the first PUSCH and the second PUSCH by the first PDCCH and the second PDCCH, different resource allocation sizes and different modulation and coding schemes (MCS) are indicated so that sizes of transport blocks respectively corresponding to the first PUSCH and the second PUSCH are identical.

10. A method comprising:

receiving, by a terminal, a first physical downlink control channel (PDCCH) for scheduling a first physical downlink shared channel (PDSCH) and a second PDCCH for scheduling a second PDSCH; and receiving, by the terminal, the first PDSCH and the second PDSCH, wherein the first PDCCH and the second PDCCH are associated with different control resource sets having different control resource set pool indexes, wherein the second PDSCH is received before transmitting hybrid automatic repeat and request (HARQ)-acknowledgement (ACK) information for the first PDSCH, wherein based on the same hybrid automatic repeat and request (HARQ) process identifier (ID) for the first PDSCH and the second PDSCH, the first PDSCH and the second PDSCH correspond to the same transport block, and wherein based on individual scheduling indicated for the first PDSCH and the second PDSCH by the first PDCCH and the second PDCCH, different resource allocation sizes and different modulation and coding schemes (MCS) are indicated so that sizes of transport blocks respectively corresponding to the first PDSCH and the second PDSCH are identical.

11. The method of claim 10, wherein the same new data indicator value is allocated to the first PDSCH and the second PDSCH.

12. The method of claim 10, wherein each of HARQ-ACK information for the first PDSCH and the second PDSCH are transmitted at the same time or different time in a time domain.

13. The method of claim 10, wherein the first PDCCH and the second PDCCH are received in a first search space and a second search space determined by a predetermined configuration or higher layer signaling, respectively.

14. The method of claim 13, wherein when different search spaces are included within a predetermined time interval in a time domain, the first search space and the second search space are determined by the predetermined configuration.

15. The method of claim 13, wherein the same number of transmission layers is allocated for the first PDSCH and the second PDSCH.

16. The method of claim 15, wherein based on a PDCCH received in a specific search space among the first search space and the second search space, the same number of transmission layers is determined.

17. The method of claim 16, wherein the specific search space is determined based on one of a search space identifier, a CORESET identifier and a CORESET pool index or determined by higher layer signaling.

* * * * *